United States Patent
Endo et al.

(10) Patent No.: US 8,011,717 B2
(45) Date of Patent: Sep. 6, 2011

(54) AUTOMOTIVE INTERIOR COMPONENT

(75) Inventors: Toyokazu Endo, Kanagawa (JP);
Masahiko Hara, Kanagawa (JP);
Hiroyuki Kojima, Kanagawa (JP);
Sumiaki Tanaka, Kanagawa (JP);
Shinya Hashimoto, Kanagawa (JP);
Noriyuki Koike, Kanagawa (JP)

(73) Assignee: Kasai Kogyo Co., Ltd, Kanagawa (JP)

( * ) Notice: Subject to any disclaimer, the term of this patent is extended or adjusted under 35 U.S.C. 154(b) by 291 days.

(21) Appl. No.: 12/396,543

(22) Filed: Mar. 3, 2009

(65) Prior Publication Data

US 2010/0225144 A1    Sep. 9, 2010

(51) Int. Cl.
*B60J 5/04* (2006.01)
*B60R 21/02* (2006.01)

(52) U.S. Cl. ............................... 296/187.05; 296/146.7

(58) Field of Classification Search ............. 296/187.03, 296/187.05, 146.7, 1.08; 188/371, 376, 377
See application file for complete search history.

(56) References Cited

U.S. PATENT DOCUMENTS

| | | | | |
|---|---|---|---|---|
| 5,431,445 A * | 7/1995 | Wheatley | ................. | 296/187.03 |
| 5,806,889 A * | 9/1998 | Suzuki et al. | ............ | 296/187.05 |
| 6,779,835 B2 * | 8/2004 | Fox et al. | ................. | 296/187.05 |
| 6,808,224 B1 * | 10/2004 | Obara | ........................ | 296/146.5 |
| 7,344,008 B1 * | 3/2008 | Jonsson et al. | ................ | 188/371 |
| 7,726,726 B2 * | 6/2010 | Cavallin et al. | .......... | 296/187.05 |
| 2001/0017476 A1 * | 8/2001 | Nishikawa et al. | ........ | 296/146.6 |
| 2005/0016807 A1 * | 1/2005 | Braymand | .................... | 188/371 |
| 2008/0012384 A1 * | 1/2008 | Sielhorst et al. | ........... | 296/146.7 |

* cited by examiner

*Primary Examiner* — Lori Lyjak
(74) *Attorney, Agent, or Firm* — Norris, McLaughlin & Marcus, P.A.

(57) ABSTRACT

There is provided an automotive interior component including an impact absorber mounted to an interior side of a side wall panel of a vehicle, and the shape and structure of the impact absorber that can undergo buckling deformation and absorb an impact load in a side collision are improved to increase an impact absorbing function. The impact absorber 30 mounted on a back surface of an impact area IA in the automotive interior component (door trim) 10 is formed as a hollow box body having an opening 31 on one side and a bottom surface wall 32 on the other side, and improvement such as providing corner cut portions 34 at four corner portions of the bottom surface wall 32, forming a chamfered portion 333 at a corner portion of a side wall 33, or forming a cam groove portion 334, a triangular rib 36, or an inner surface rib 321 is made to adjust a reaction force in a side collision to increase an impact absorbing function.

7 Claims, 27 Drawing Sheets

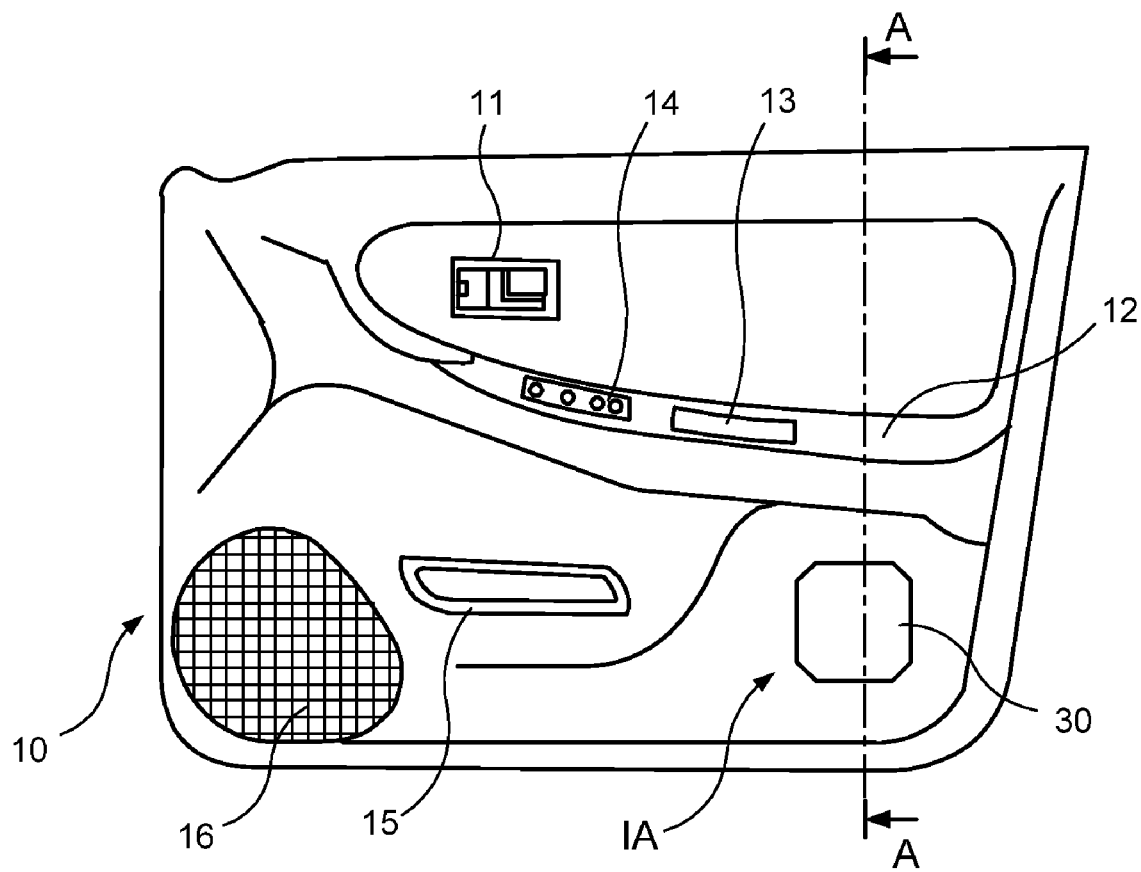
F I G. 1

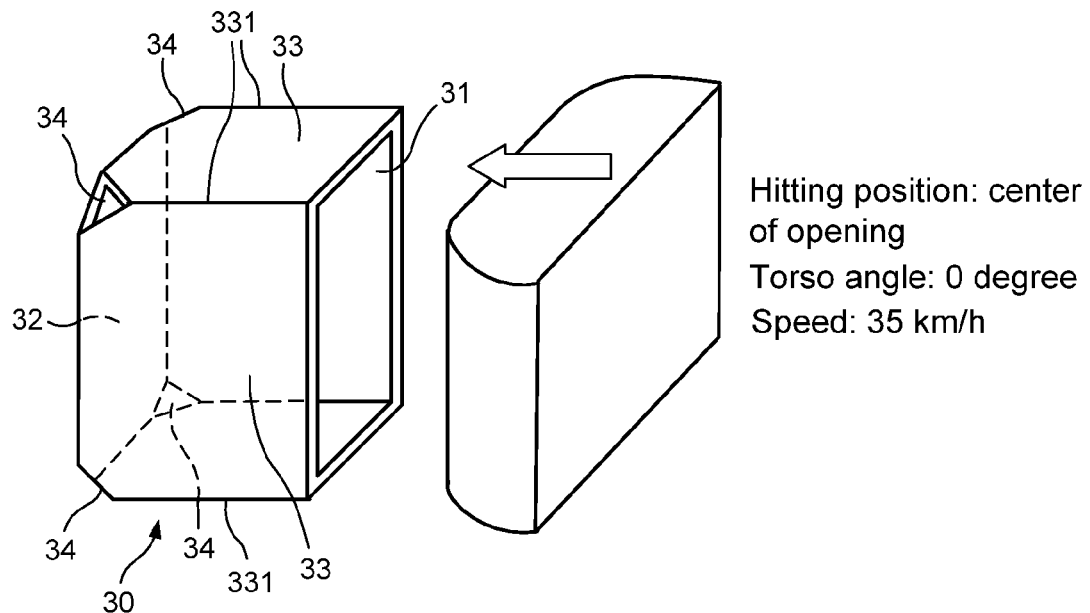
Hitting position: center of opening
Torso angle: 0 degree
Speed: 35 km/h
F I G. 4
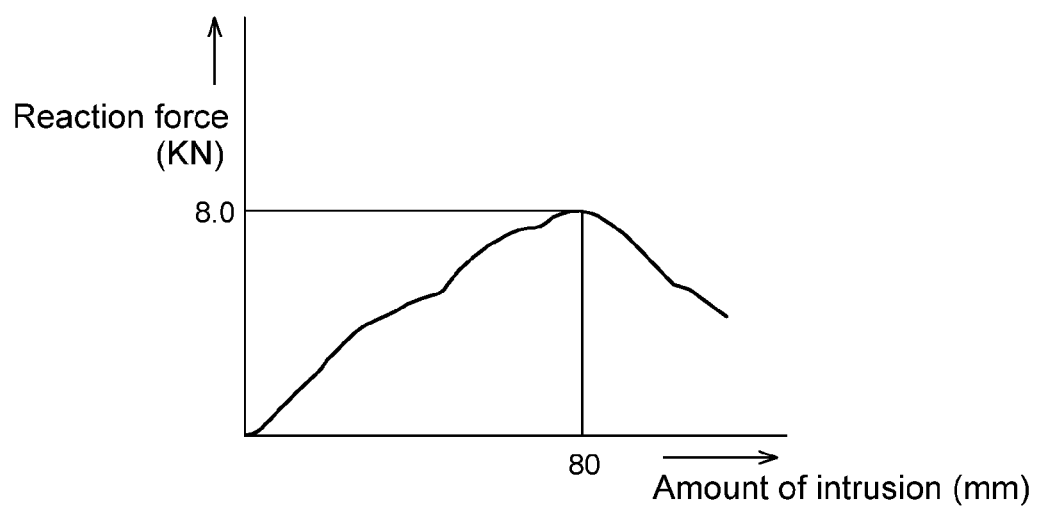
F I G. 5

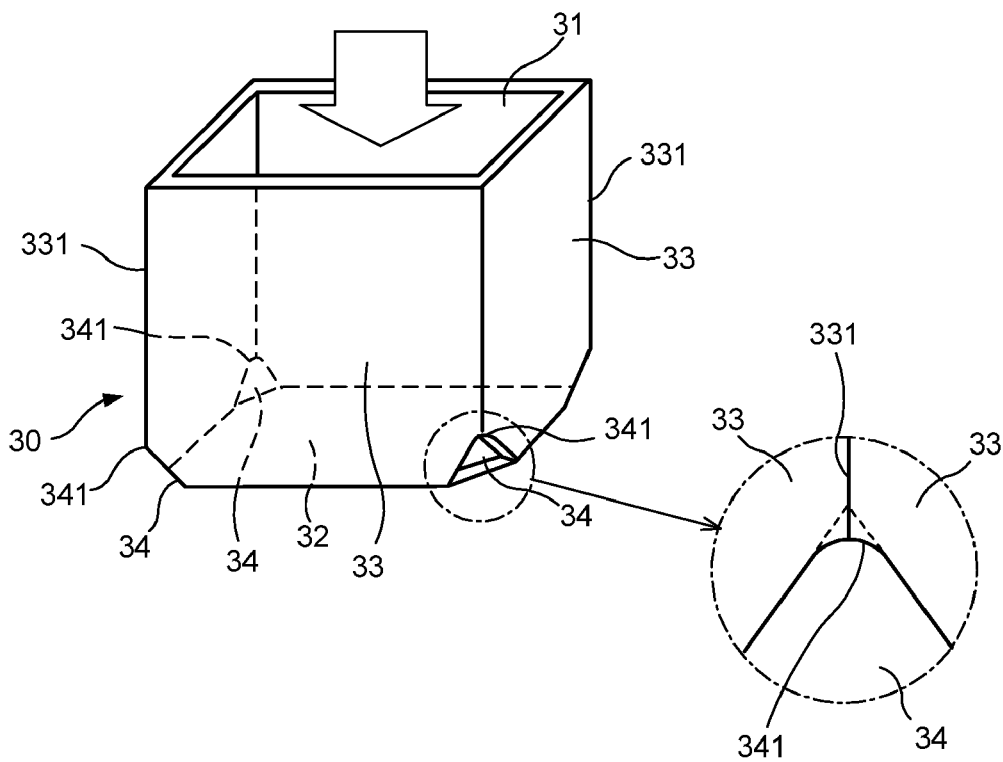
F I G. 6
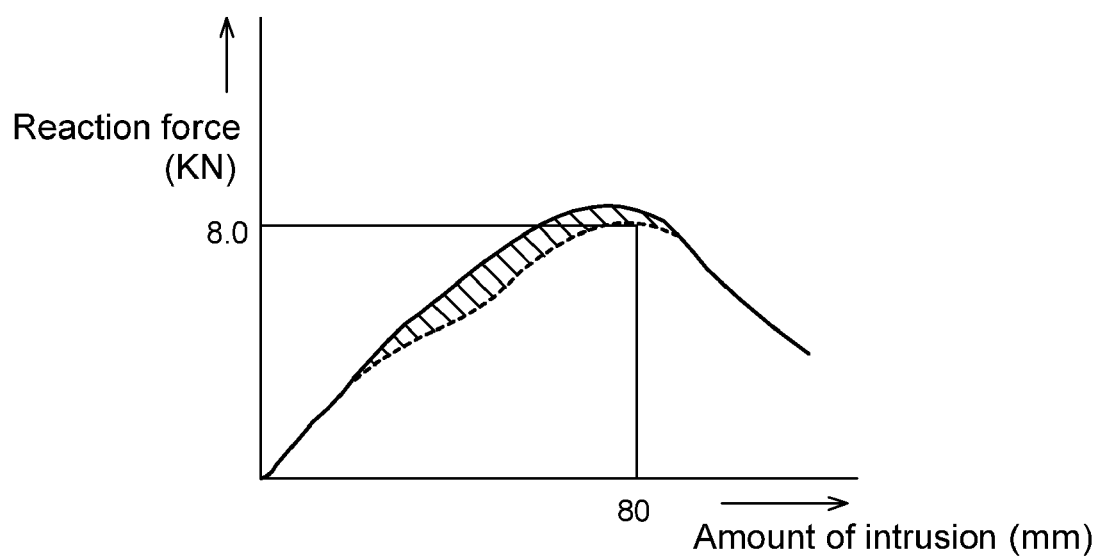
F I G. 7

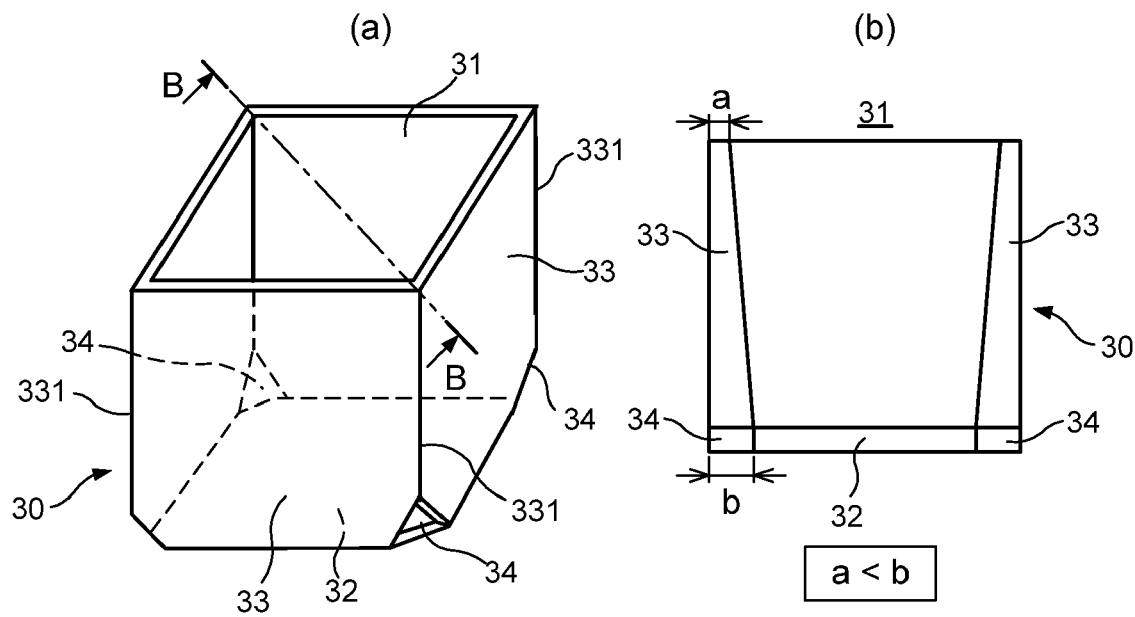
F I G. 8
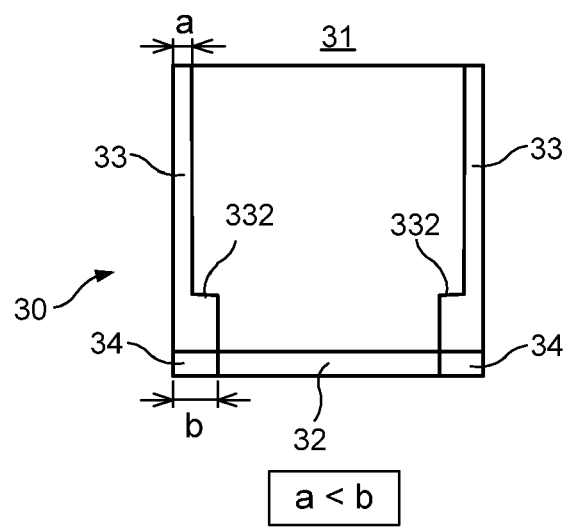
F I G. 9

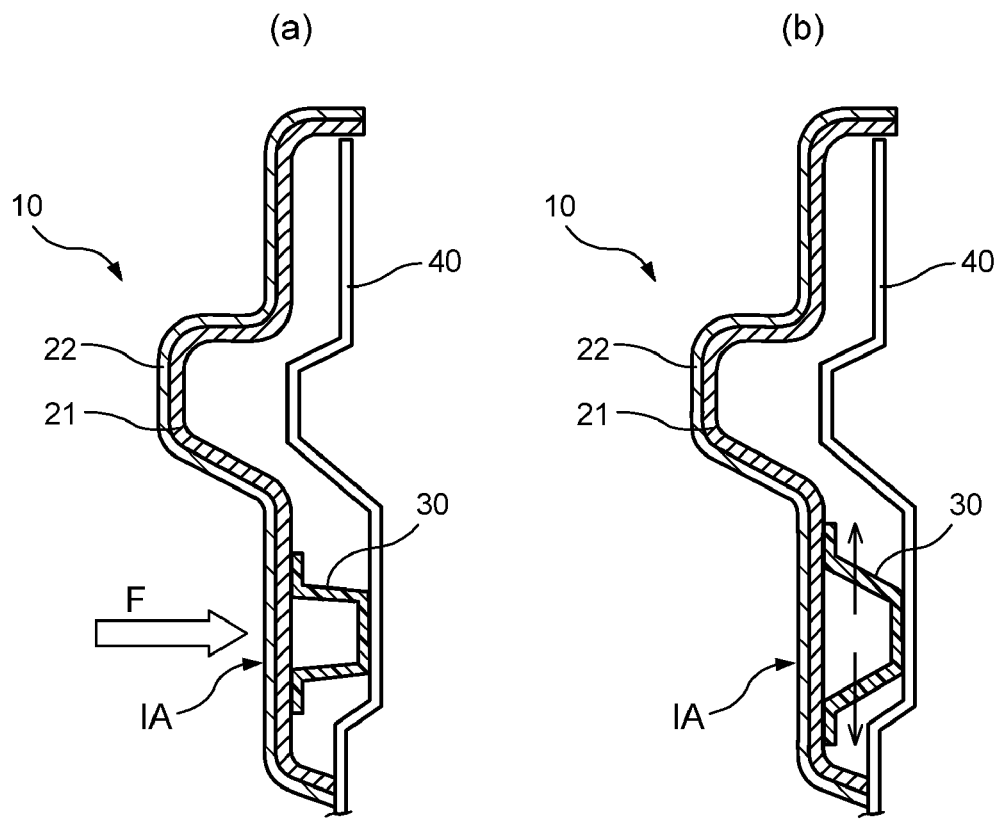
F I G. 12
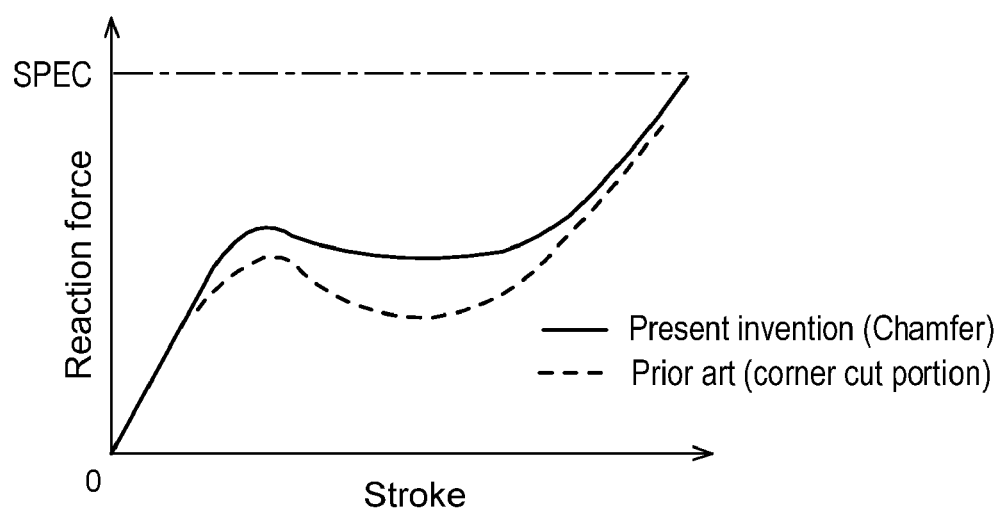
F I G. 13

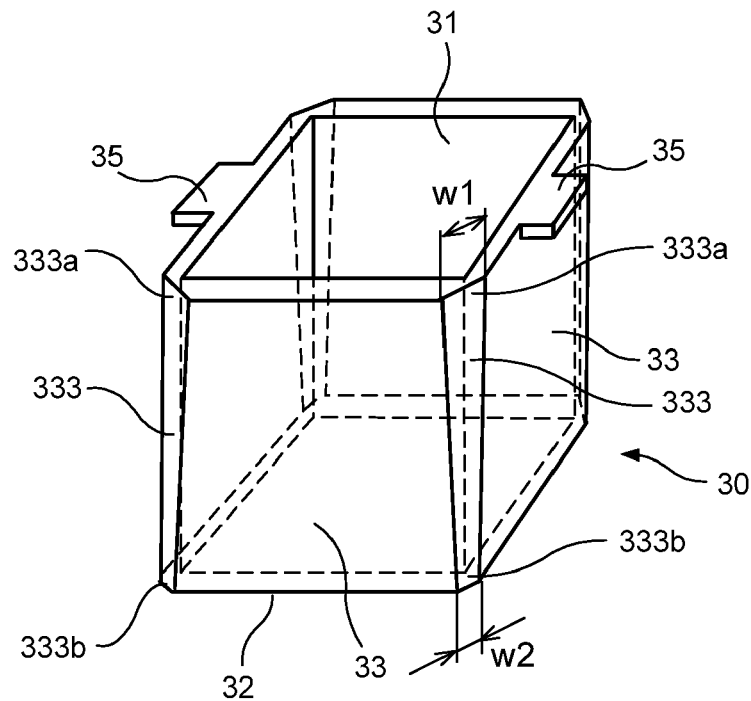
F I G. 14
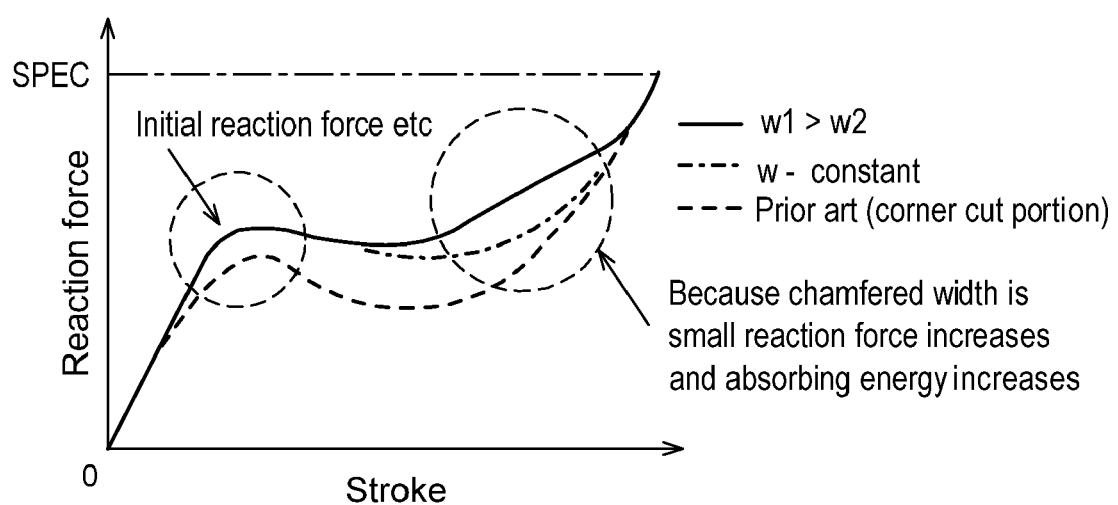
F I G. 15

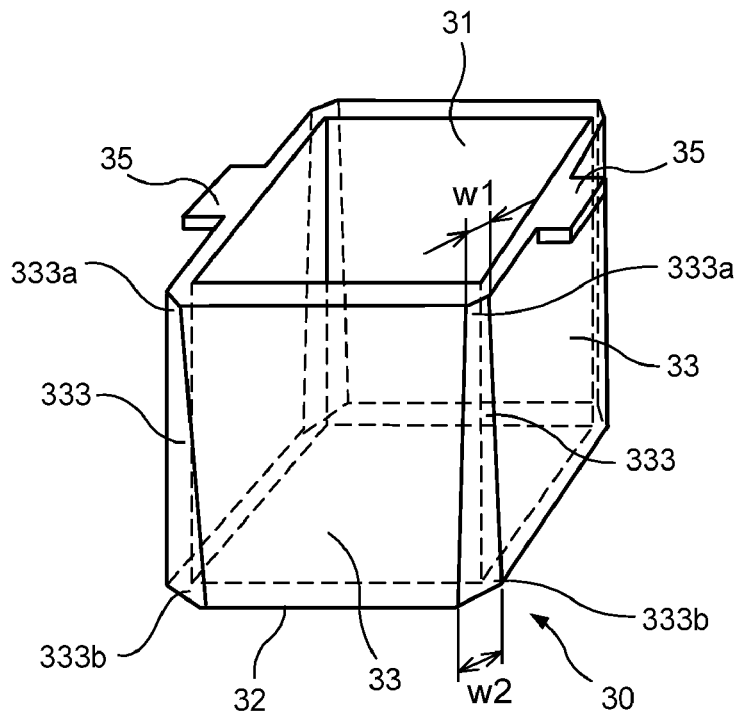
F I G. 16
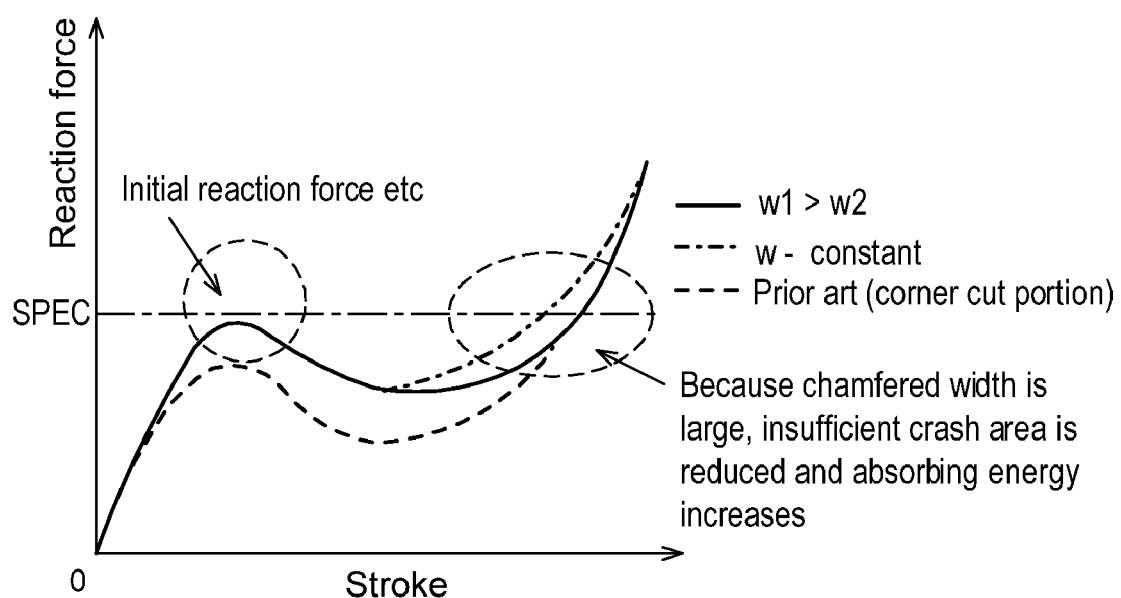
F I G. 17

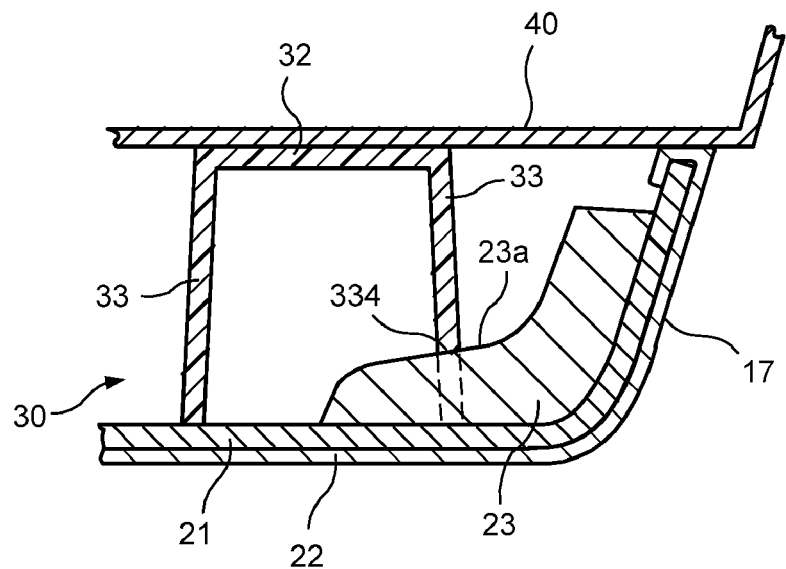
F I G. 20
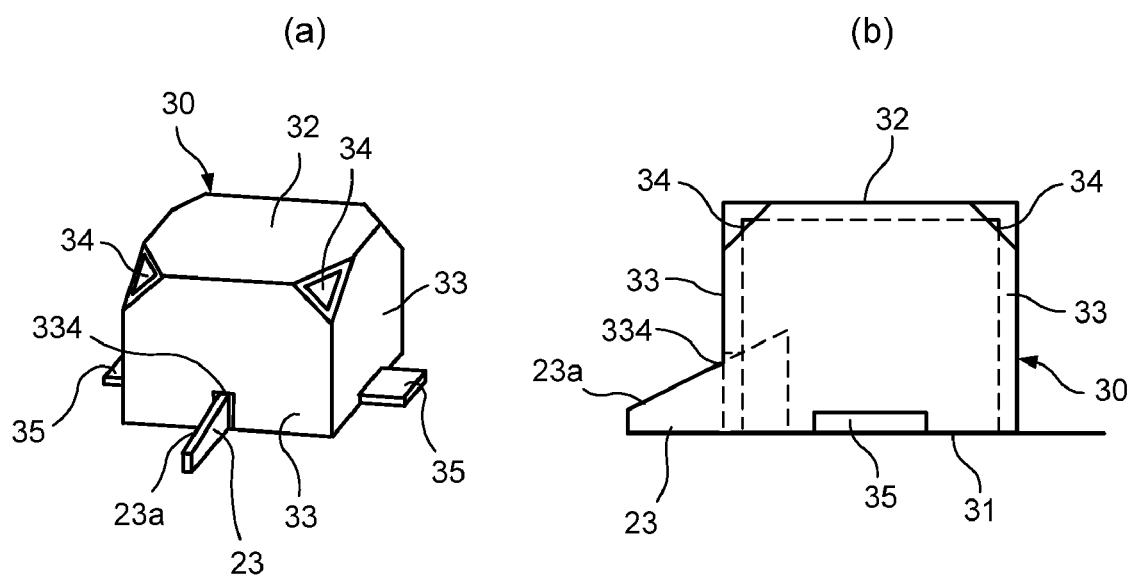
F I G. 21

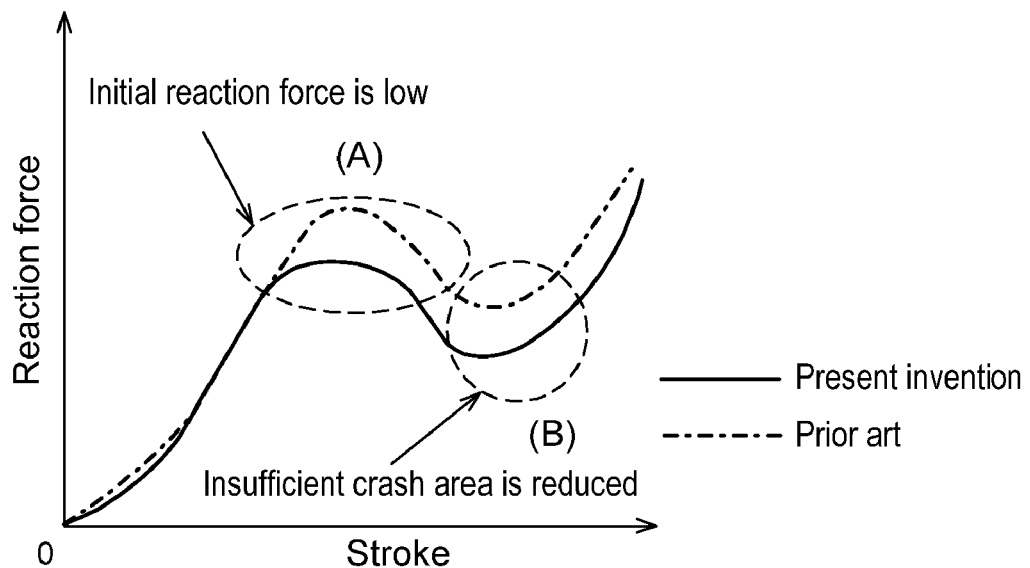
F I G. 24
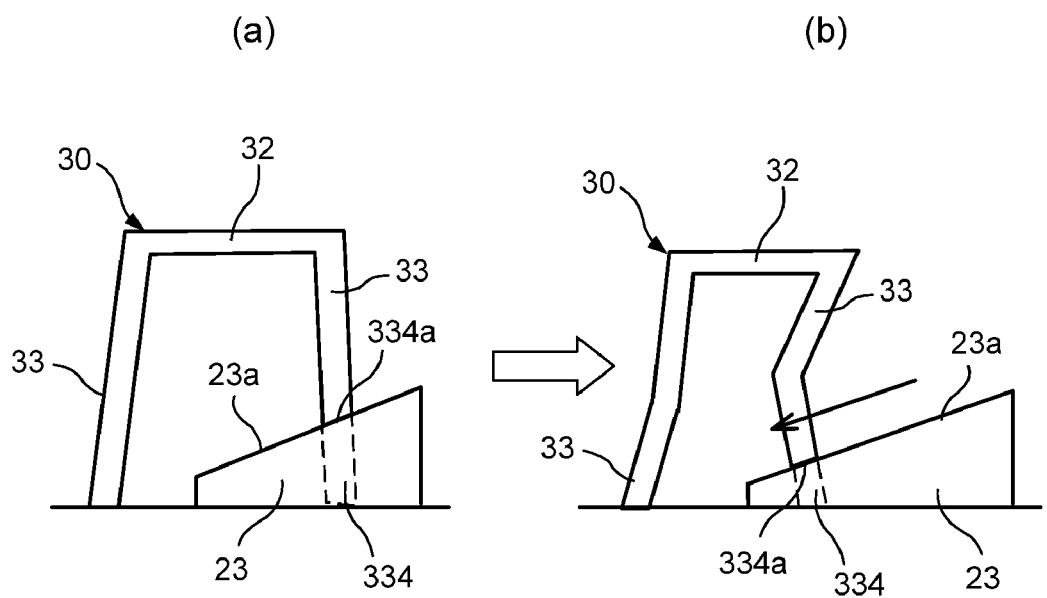
F I G. 25

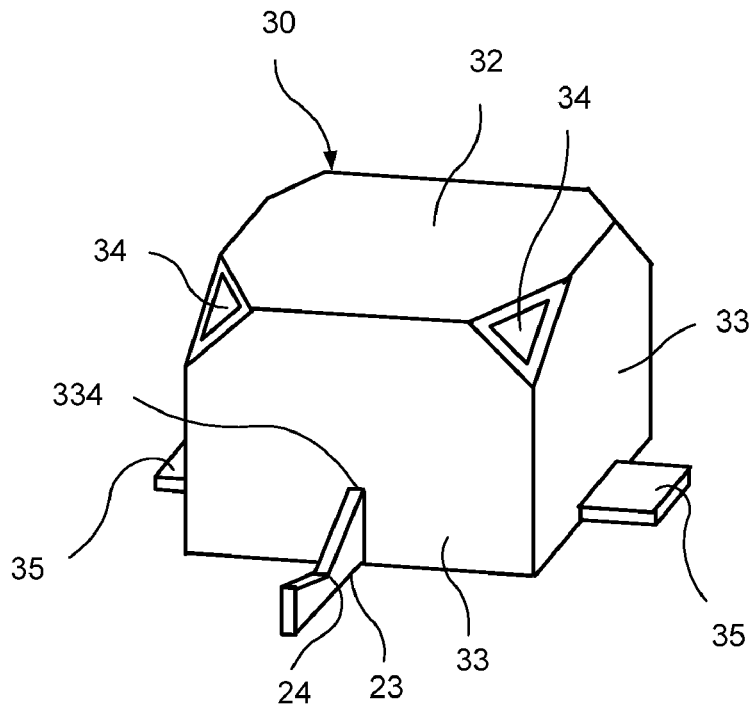
F I G. 26
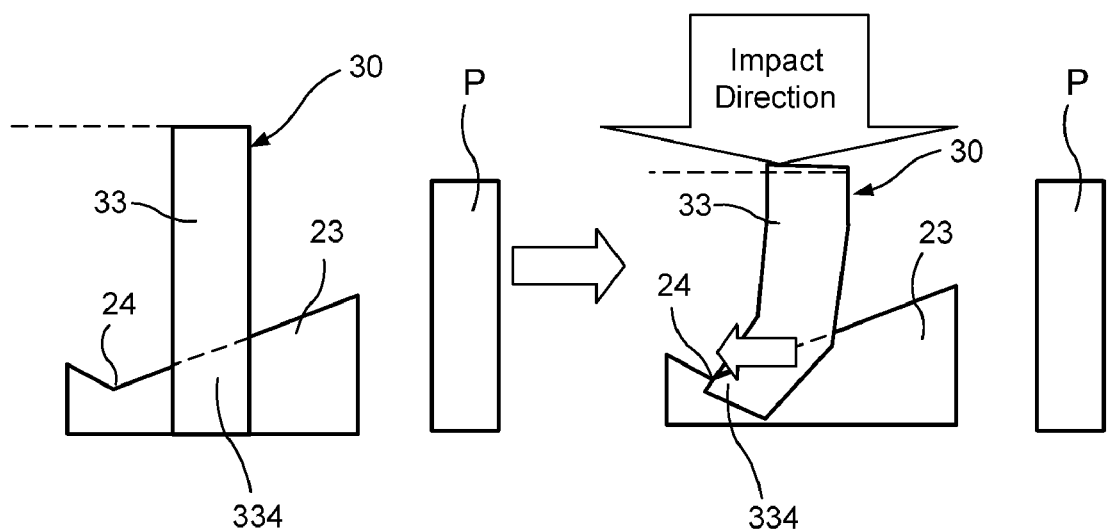
F I G. 27

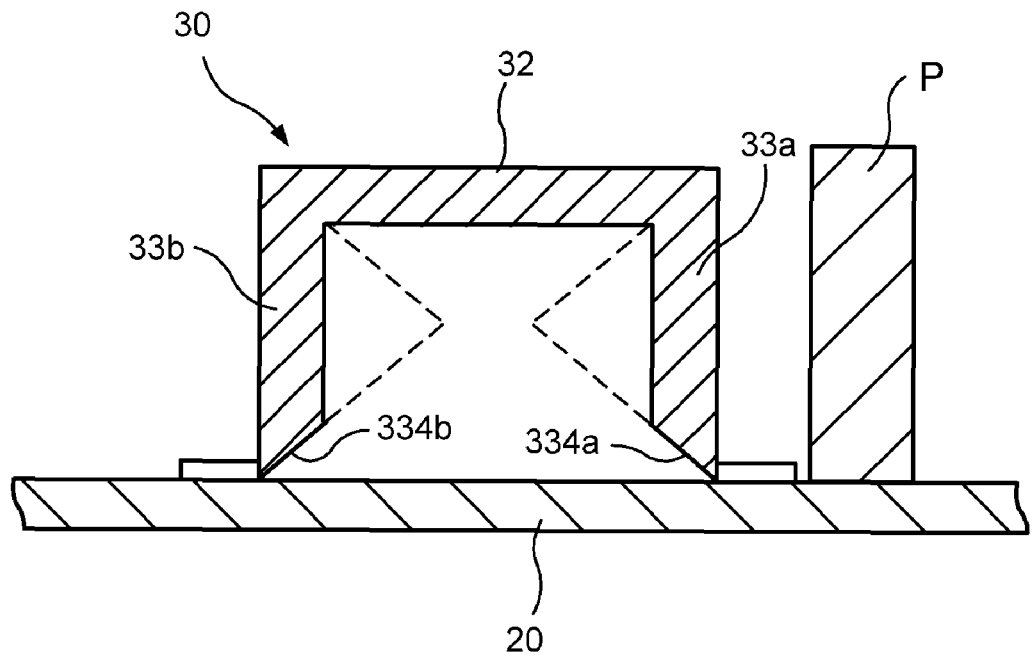
F I G. 30
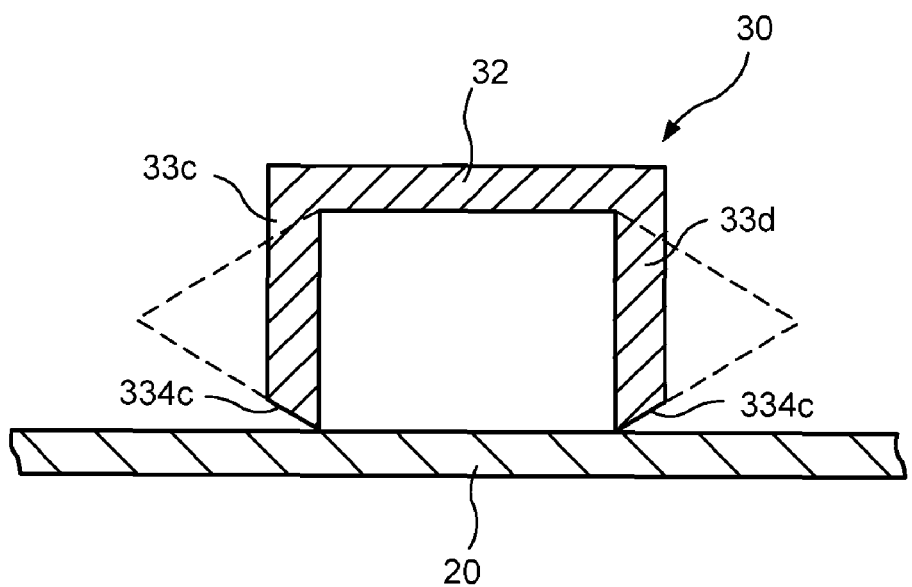
F I G. 31

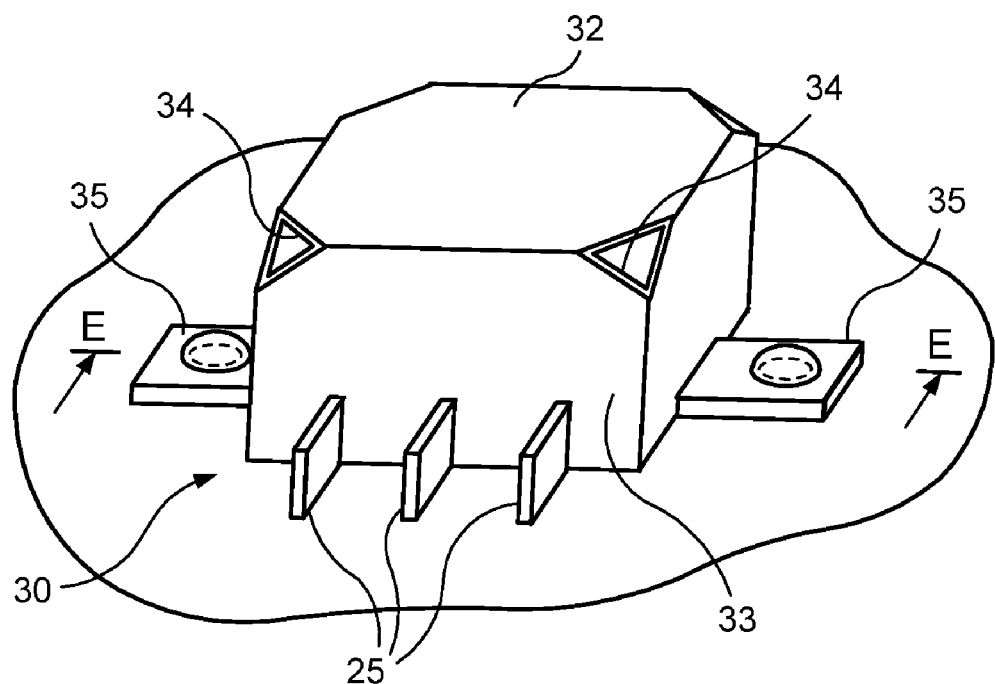
F I G. 34
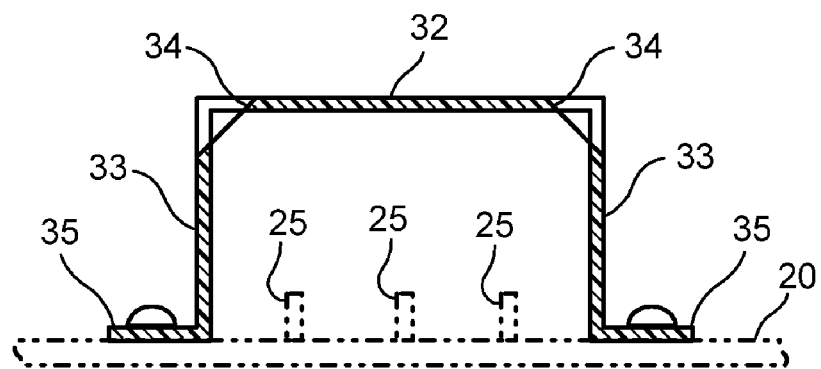
F I G. 35

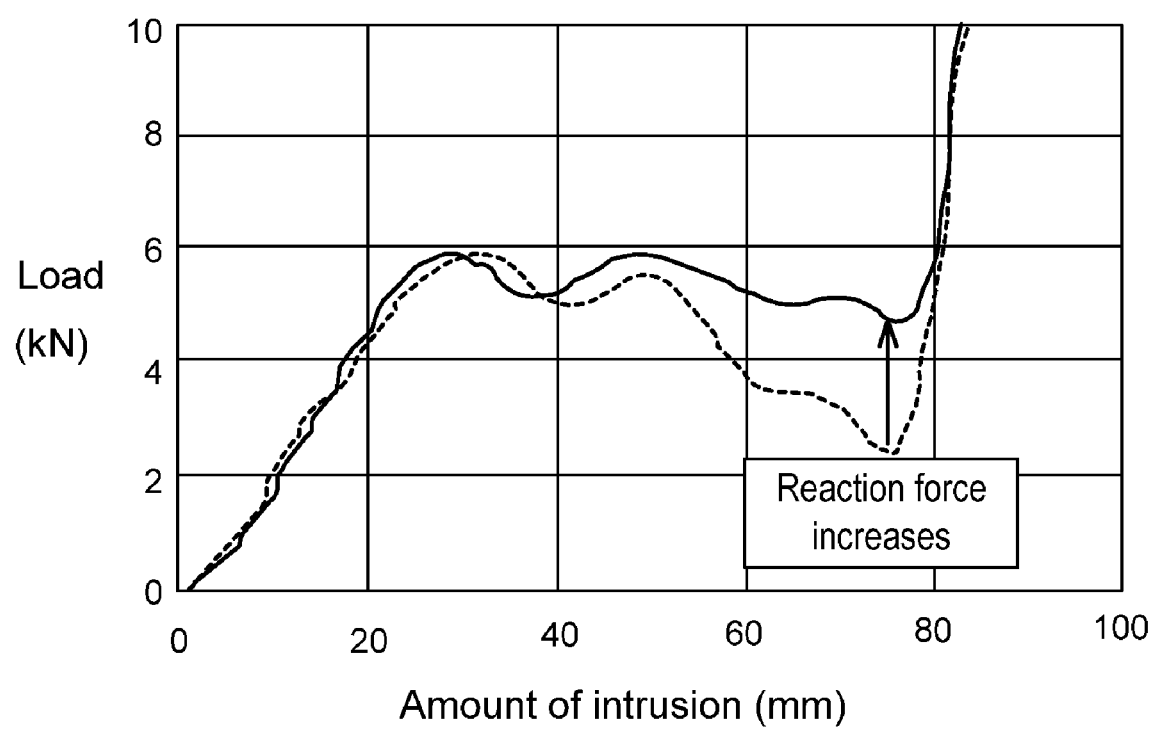
F I G. 46

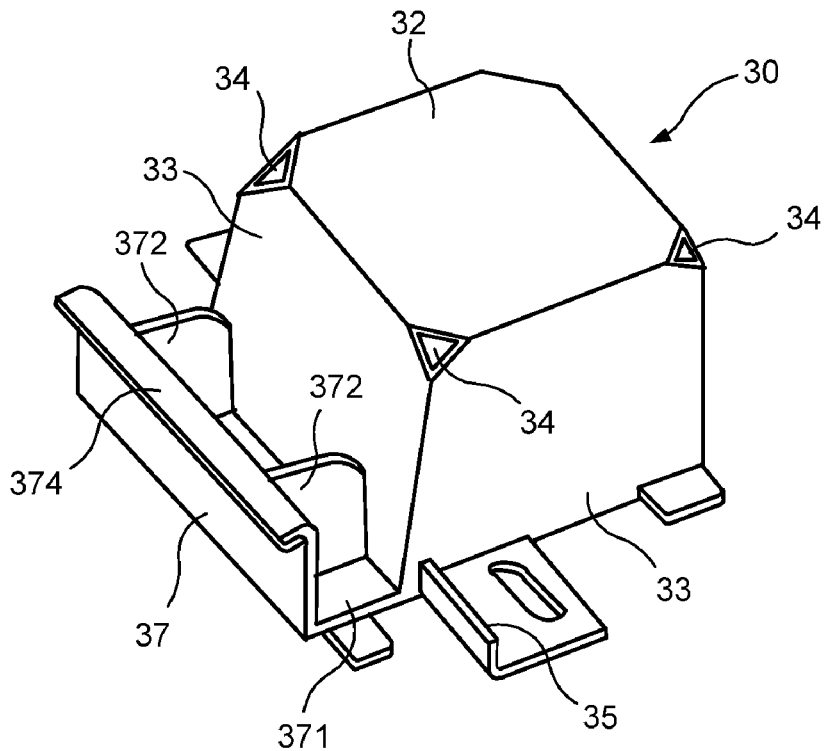
F I G. 49
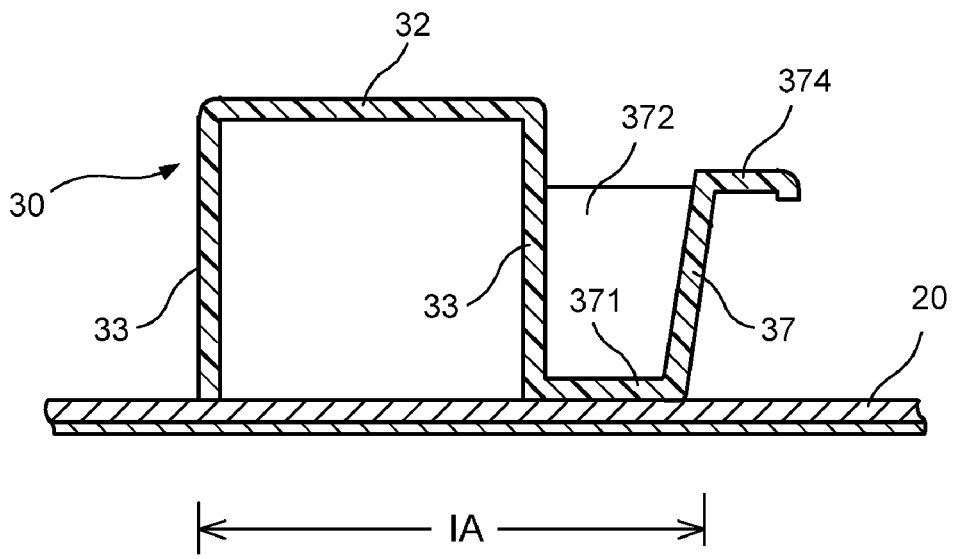
F I G. 50

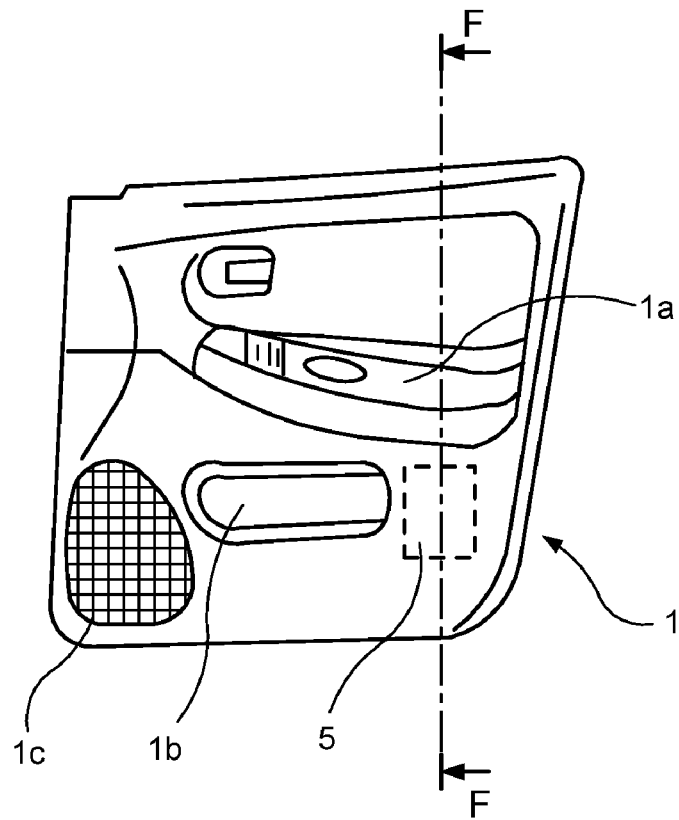
F I G. 51
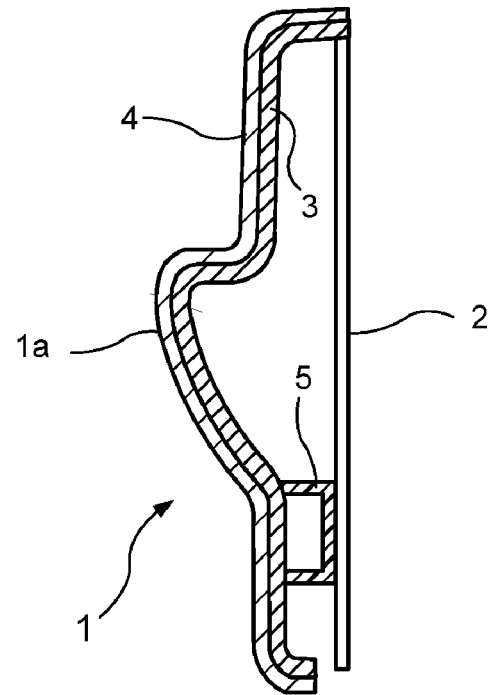
F I G. 52 hitting direction
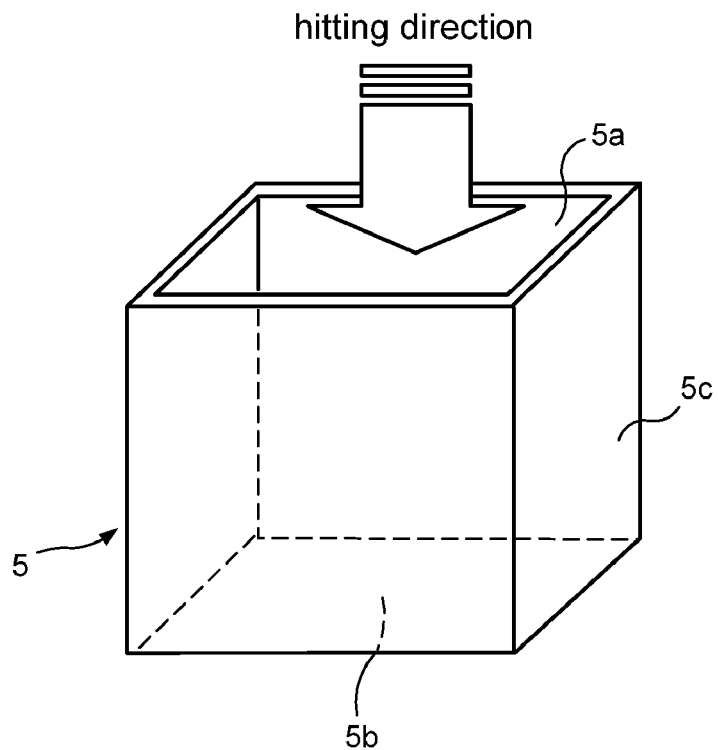
F I G. 53
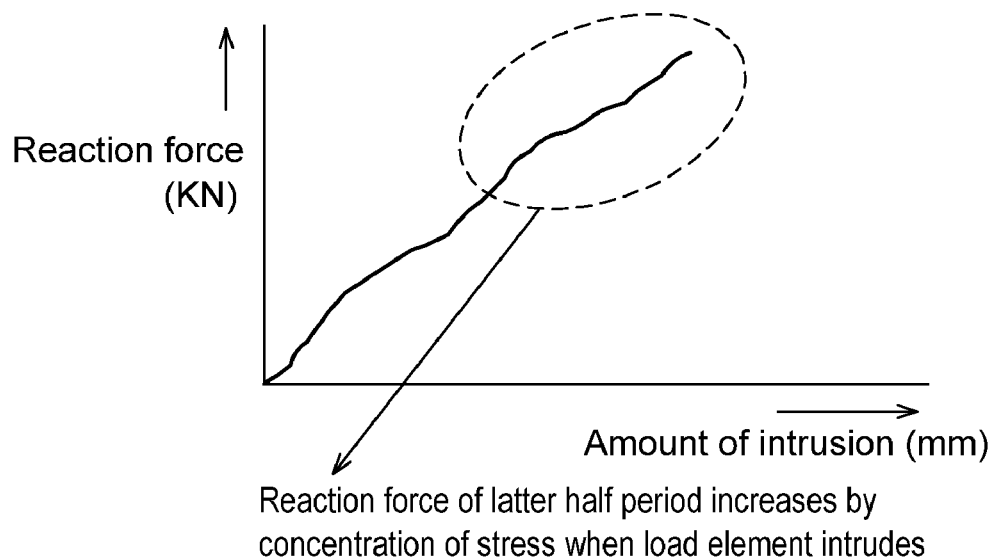
Reaction force of latter half period increases by concentration of stress when load element intrudes
F I G. 54

AUTOMOTIVE INTERIOR COMPONENT

BACKGROUND OF THE INVENTION

1. Field of the Invention

The present invention relates to an automotive interior component mounted to an interior side of a side wall panel of a vehicle such as a door trim or a rear side trim, and more particularly to an automotive interior component that increases energy absorbing performance in a side collision and reduces a load applied to an occupant.

2. Description of the Related Art

Generally, various automotive interior components are mounted in a vehicle cabin, and a typical interior component is an automotive door trim mounted to a side wall panel of a vehicle.

A configuration of the automotive door trim will be described with reference to a front view of the door trim in FIG. 51 and a sectional view of the automotive door trim in FIG. 52. In the drawings, an automotive door trim 1 expands on an interior side, an arm rest 1a is formed to expand on the interior side so that an occupant can place his/her elbow thereon for rest, a door pocket 1b that can accommodate accessories is formed below the arm rest 1a, and a speaker grill 1c is formed on a front side of the arm rest 1a integrally with or separately from the door trim 1.

As shown in FIG. 52, the automotive door trim 1 is formed into a required shape and formed of a laminate of a resin core member 3 having a shape retention property and mounting rigidity to a door panel 2 and a surface skin 4 that is laminated on a front side of the resin core member 3 and has good surface texture and is pleasant to touch.

Further, an impact absorber 5 is secured to a back surface of the resin core member 3 of the door trim 1 in a so-called impact area portion that the waist or shoulder of the occupant is prone to touch when a lateral impact is applied to the vehicle.

The impact absorber 5 is formed of a hollow box body having an opening 5a on one side facing the door panel 2, and generally made of a resin material including polypropylene (PP) resin to which rubber ingredient is added and having high impact absorbing performance. Generally, a bottom surface wall 5b of the impact absorber 5 is bonded to the resin core member 3 with a hot melt adhesive or the like. In a side collision, an impact is applied to the opening 5a as shown by the arrow in the drawing. Reference numeral 5c denotes a side wall (for example, see Japanese Patent Laid-open No. 9-142252 (pp. 4 and 5, FIGS. 7 to 9)).

As such, in the conventional door trim 1, the impact absorber 5 formed of the hollow box body is provided on the back surface of the resin core member 3 in the impact area that the waist or shoulder of the occupant is prone to touch. However, for impact absorbing performance of the conventional impact absorber 5, as shown in the graph in FIG. 13, a deformation stroke amount of bending deformation of the side wall 5c of the impact absorber 5 substantially linearly increases in proportion to a reaction force. Particularly, a reaction force in the latter half period during an impact load increases, and thus the reaction force in the latter half period during an impact load urgently needs to be reduced.

It is supposed that a factor for the increase in the reaction force in the latter half period during an impact load is that four corner portions of the bottom surface wall 5b have high rigidity in bending deformation of the side wall 5c of the impact absorber 5.

The present invention is achieved in view of such circumstances, and has an object to provide an automotive interior component mounted to a side wall panel of a vehicle, and particularly an automotive interior component that reduces a reaction force in the latter half period in a side collision to increase energy absorbing performance.

The present invention has another object to provide an automotive interior component that reduces a reaction force in the latter half period during an impact load, can expect an appropriate reaction force value even in the former half period during an impact load, and increases energy absorbing performance in both the former and latter half periods during an impact load.

SUMMARY OF THE INVENTION

To achieve the above described object, the present invention provides an automotive interior component mounted to an interior side of a side wall panel of a vehicle, including: a trim body as a base; and an impact absorber placed on a back surface of the trim body in an impact area that the waist or shoulder of an occupant is prone to touch in a side collision, wherein the impact absorber is formed of a hollow box body of resin having an opening on one side and a bottom surface wall on the other side, mounted to the trim body with one of the opening and the bottom surface wall facing the side wall panel, and includes impact absorbing function enhancing means formed by cutting the impact absorber itself, adding a rib, or adding a support structure between a side wall and the trim body.

The automotive interior component mounted to the interior side of the side wall panel of the vehicle is, for example, a door trim or a rear side trim. The interior component includes the trim body such as a door trim body or a rear side trim body formed into a desired curved shape, and the impact absorber placed on the back surface of the trim body. The impact absorber is placed on the back surface of the trim body in the impact area that the waist or shoulder of the occupant is prone to touch. The trim body may be made of thermoplastic resin, for example, polyethylene resin, polypropylene resin, polystyrene resin, polyethylene terephthalate resin, polyvinyl alcohol resin, vinyl chloride resin, polyamide resin, polyacetal resin, polycarbonate resin, ionomer resin, or acrylonitrile butadiene styrene (ABS) resin. If desired, filler, for example, inorganic fiber such as glass fiber or carbon fiber, or inorganic particles such as talc, clay, silica or calcium carbonate may be mixed into the thermoplastic resin. If desired, a surface skin such as woven fabric, nonwoven fabric or synthetic resin sheet may be attached to a surface of a resin core member formed of the thermoplastic resin by mold press forming or injection molding into a required shape.

The impact absorber may be formed of the hollow box body having the opening on one side and the bottom surface wall on the other side, and can absorb an impact load by buckling deformation of the hollow box body in a side collision. The impact absorber is preferably made of a resin material having high impact absorbing performance, for example, an elastomer resin material including polypropylene (PP) resin into which rubber ingredient (for example, ethylene propylene rubber (EPR)) is mixed at an appropriate mixing ratio.

Then, the resin material is formed into the hollow box body having the opening on one side. At this time, the impact absorber may be mounted with the opening facing the side wall panel and the bottom surface wall being secured to the back surface of the trim body with a hot melt adhesive, or with the bottom surface wall facing the side wall panel. The impact absorber further includes the impact absorbing function enhancing means formed by cutting the impact absorber itself, adding a rib, or adding a new support structure between the side wall of the impact absorber and the trim body. Instead of bonding with an adhesive, ultrasonic welding or thermal welding may be performed.

Thus, according to the present invention, the impact absorber provided on the back surface of the trim body is formed of the hollow box body having the opening on one side and the bottom surface wall on the other side. Further, the impact absorber includes the impact absorbing function enhancing means, thereby allowing effective absorption of an impact load in a side collision and reducing a load applied to an occupant.

Next, in a preferred embodiment of the present invention, the impact absorbing function enhancing means is a corner cut portion provided in an open manner at a corner of the bottom surface wall of the impact absorber.

Thus, according to the embodiment, the corner cut portion is formed by cutting at the corner of the bottom surface wall of the impact absorber, and thus when an impact is applied in a side collision, stress does not concentrate on one point and is distributed to three points of the corner cut portion, thereby reducing a reaction force particularly in the latter half period during an impact load. The side wall is not hard to bend (under tension) as bending deformation of the side wall of the impact absorber proceeds, thereby effectively reducing a reaction force particularly in the latter half period during an impact load.

Next, in a preferred embodiment of the present invention, the impact absorbing function enhancing means is a chamfered portion formed at the corner of the side wall of the impact absorber, and the chamfered portion increases an initial reaction force in a side collision.

To mount the impact absorber used in the embodiment to the back surface of the trim body, flanges provided on opposite edges of the side wall may be bonded with a hot melt adhesive, or the flanges may be mounted to the back surface of the trim body by ultrasonic welding or thermal welding. Also, a corner portion of the side wall of the hollow box body is chamfered.

Thus, according to the embodiment, in a side collision, the impact absorber formed of the hollow box body can undergo buckling deformation to effectively absorb an impact. Particularly, the corner portion of the side wall is chamfered, and thus the side wall of the hollow box body is deformed so that the opening side expands more outwardly than the bottom surface wall side in a side collision, thereby increasing an initial reaction force.

Next, in a further embodiment of the present invention, the impact absorbing function enhancing means is configured in such a manner that a cam groove portion is formed in the side wall of the impact absorber, a guide rib having an inclined portion is formed on the back surface of the trim body, and the guide rib is housed in the cam groove portion, and when a load is applied to the impact absorber in a side collision, the cam groove portion slides along the inclined portion of the guide rib to facilitate buckling deformation of the impact absorber while controlling a buckling direction.

The embodiment has a feature to control the buckling direction of the impact absorber in a side collision. As the configuration therefor, the guide rib having the inclined portion is formed on the back surface of the trim body, and the cam groove portion is provided in the side wall of the hollow box body for achieving cam action in relation to the guide rib. The guide rib may be formed integrally with the trim body in molding the trim body by mold press forming or injection molding. However, when the trim body is formed by draw forming of, for example, a woody core material or a whole cloth sheet, a bracket including a guide rib integrated with a resin plate may be separately provided to form the guide rib on the woody core material or the like. If an area of the cam groove portion that abuts against the inclined portion of the guide rib is an inclined surface, the cam groove portion smoothly slides along the inclined portion of the guide rib in a side collision, thereby efficiently reducing an initial reaction force.

Thus, according to the embodiment, the impact load is applied to the bottom surface wall of the impact absorber and stress from the bottom surface wall is transferred to the side wall around the bottom surface wall in a side collision, but the cam groove portion slides along the inclined portion of the guide rib provided on the trim body, and thus the side wall of the impact absorber buckles while being guided in an inclination direction of the guide rib, thereby allowing effective control of the buckling direction of the impact absorber. Thus, when a vertical wall flange portion that provides three-dimensional feeling to a product is formed, the impact absorber can be placed near the vertical wall flange portion. The impact absorber may be also placed near a structure such as a pocket back cover or a lock unit placed on the back surface of the trim body, thereby allowing effective control of reaction force adjustment in a side collision and free selection of a placement position of the impact absorber.

Further, in a preferred embodiment of the present invention, the impact absorbing function enhancing means is a strut piece that is provided on the back surface of the trim body and abuts against an outer surface of the side wall of the impact absorber.

According to the above described embodiment, even if a load is applied to the impact absorber in a side collision, a load direction is inclined to the impact absorber and a sliding force is applied, the strut piece formed on the back surface of the trim body becomes under tension against a force in a sliding direction of the side wall, thereby obtaining an appropriate reaction force to the impact load, and achieving a good impact absorbing function.

Next, in a further preferred embodiment of the present invention, the impact absorbing function enhancing means is a triangular rib formed on an inner surface of the impact absorber from the bottom surface wall to the side wall for controlling excessive bending deformation of the side wall caused by impacts from different directions.

A plurality of triangular ribs are formed from the inner surface of the bottom surface wall to the inner surface of the side wall of the impact absorber. The triangular ribs can be formed to allow variations in reaction force to be accommodated when impacts from different directions are applied to the interior component. For the shape of the triangular rib, the height of the triangular rib is preferably 50% to 80% of the height of the impact absorber, and the size of the base of the triangular rib is preferably 10% to 40% of the width of the impact absorber, and the angle of the triangular rib is preferably 20° to 45°. The rib is specified to the triangular rib because if a rib laterally connecting opposite ends of the impact absorber is used, a reaction force to a frontal impact load also increases. The triangular rib is preferable because the force is uniformly distributed, and when the triangular rib is formed, performance against impacts from different directions can be improved without increasing a frontal reaction force.

Thus, according to the embodiment, in a side collision, the impact absorber formed of the hollow box body can undergo buckling deformation to effectively absorb impacts. Particularly, the triangular ribs are formed from the inner surface of the bottom surface wall to the inner surface of the side wall, and thus sufficient energy absorbing action can be expected for impacts from different directions.

In a further preferred embodiment of the present invention, the impact absorbing function enhancing means is an inner surface rib that is provided to stand on the inner surface of the bottom surface wall of the impact absorber and extends toward the opening while maintaining a space from the side wall, and rigidity of the inner surface rib prevents a reduction in reaction force in the latter half period in a side collision.

The inner surface rib of a plate shape that extends from the inner surface of the bottom surface wall of the impact absorber toward the opening while maintaining a space from the side wall is formed in a protruding manner. The inner surface rib can be formed to prevent an excessive reduction in reaction force in the latter half period in a side collision. The rib height of the inner surface rib is preferably 10% to 90% of the height of the hollow box body of the impact absorber, and can be selected in view of a desired impact absorbing property.

Thus, according to the embodiment, in a side collision, the impact absorber formed of the hollow box body can undergo buckling deformation to effectively absorb an impact. Particularly, the inner surface rib is formed to stand on the inner surface of the bottom surface wall and extends toward the opening while maintaining a space from the side wall, thus the inner surface rib serves as a stopper wall in the latter half period in a side collision to prevent an excessive reduction in reaction force in the latter half period, and ideal energy absorbing action can be expected.

Next, in a further preferred embodiment of the present invention, the impact absorbing function enhancing means is an impact absorbing rib that has a coupling plate extending outwardly from the side wall placed on a lateral side of the four-face side wall of the impact absorber along the back surface of the trim body and is provided so as to stand toward the side wall panel via the coupling plate, and besides the impact absorber, the impact absorbing rib also undergoes buckling deformation in a side collision to increase an area as the impact area in a longitudinal direction of the vehicle.

According to the embodiment, the impact absorbing rib is provided on the lateral side of the impact absorber via the coupling plate, and an impact absorbing function by the impact absorbing rib can be obtained while maintaining a compact size of the impact absorber formed of the hollow box body. Thus, the impact area can be increased in a fore/aft direction of the vehicle, and if the position of a front sheet is variable according to body types of an occupant, for example, a small woman at a frontmost position and a general adult man can be both accommodated. When there is a protrusion from the side wall panel of the vehicle body toward the trim body, an irregular shape formed by the impact absorber, the coupling plate, and the impact absorbing rib can avoid interference with the protrusion.

As described above, the automotive interior component according to the present invention is the automotive interior component including the impact absorber, the impact absorber is formed of the hollow box body having high impact absorbing performance, and particularly the corner cut portion is provided at the corner of the bottom surface wall to prevent stress concentration in the latter half period during an impact load and reduce a reaction force. Thus, energy absorbing performance can be increased particularly in the latter half period during an impact load.

Further, the resin material having high impact absorbing performance is formed into a hollow box shape as the impact absorber, the corner cut portion is formed at the corner of the bottom surface wall, and the corner cut portion is rounded or the thickness of the vertical wall portion is adjusted, thereby ensuring good energy absorbing performance in both the former and latter half periods during an impact load without an excessive reduction in reaction force in the former half period during an impact load.

Further, according to the embodiment of the automotive interior component of the present invention, the impact absorber is formed of the hollow box body having the opening on one side and the bottom surface wall on the other side, and the impact absorber is mounted to the trim body with the opening or the bottom surface wall facing the side wall panel. The buckling deformation of the impact absorber in a side collision provides an appropriate impact absorbing function. The corner portion of the side wall is chamfered to increase the initial reaction force, or at least two triangular ribs are formed from the surface of the bottom surface wall to the inner surface of the side wall in each side around the bottom surface wall, thereby allowing impacts from two directions to be accommodated. Alternatively, the guide rib is formed on the back surface of the trim body, and the cam groove portion is formed in the side wall of the impact absorber so as to be placed over the guide rib to control the buckling direction in a side collision, or the strut piece that abuts against the side wall of the impact absorber is provided on the back surface of the door trim body to adjust the reaction force, thereby increasing energy absorbing performance in a side collision.

According to the further embodiment of the present invention, the automotive interior component includes the trim body mounted to the interior side of the side wall panel of the vehicle, and the impact absorber placed on the back surface of the trim body in the impact area that the waist or shoulder of the occupant is prone to touch, the impact absorber is formed of the hollow box body having the opening on one side and the bottom surface wall on the other side, the inner surface rib extending toward the opening while maintaining a space from the side wall is formed substantially in the middle of the inner surface of the bottom surface wall, and the reduction in reaction force in the latter half period in a side collision can be prevented by stopper action of the inner surface rib, and thus an impact absorbing structure having a lower limit of a target value in impact absorption can be effectively accommodated.

Further, according to the further embodiment of the present invention, the coupling plate is provided to extend from the side wall placed on the lateral side of the impact absorber formed of the hollow box body along the back surface of the trim body, and the impact absorbing rib extending toward the side wall panel is formed to stand at the end of the coupling plate and provided on the impact absorber. Thus, a small woman at a frontmost position and a general adult man can be both accommodated. Also, the impact absorbing rib is provided on the impact absorber maintaining the compact size, thereby avoiding interference if there is a protrusion toward the trim on the side wall panel, and increasing placement flexibility.

BRIEF DESCRIPTION OF THE DRAWINGS

FIG. 1 is a front view of an automotive door trim to which the present invention is applied;

FIG. 4 illustrates a test method for measuring impact absorbing performance of the impact absorber in FIG. 3;

FIG. 5 is a graph showing a correlation between a reaction force and an amount of intrusion of the impact absorber in FIG. 3;

FIG. 6 is a perspective view of a variant of the first embodiment of the impact absorber used in the present invention;

FIG. 7 is a graph showing a correlation between a reaction force and an amount of intrusion of the impact absorber in FIG. 6;

FIG. 8(a) is a perspective view of the variant of the first embodiment of the impact absorber used in the present invention;

FIG. 8(b) is a sectional view taken along the line B-B in FIG. 8(a);

FIG. 9 is a sectional view of another variant of the first embodiment of the impact absorber used in the present invention;

FIG. 12 illustrates impact absorbing performance of the impact absorber in FIG. 11 in a side collision;

FIG. 13 is a graph showing impact absorbing performance of the impact absorber in FIG. 11;

FIG. 14 is a perspective view of a variant of the second embodiment of the impact absorber used in the automotive interior component according to the present invention;

FIG. 15 is a graph showing impact absorbing performance of the impact absorber in FIG. 14;

FIG. 16 is a perspective view of another variant of the second embodiment of the impact absorber used in the automotive interior component according to the present invention;

FIG. 17 is a graph showing impact absorbing performance of the impact absorber in FIG. 16;

FIG. 20 illustrates a third embodiment of an impact absorber used in the automotive interior component according to the present invention;

FIG. 21(a) is a perspective view of the third embodiment of the impact absorber used in the automotive interior component according to the present invention;

FIG. 21(b) is a sectional view thereof;

FIG. 22(a) illustrates a state before a side collision;

FIG. 22(b) illustrates a state after a side collision;

FIG. 24 is a graph showing impact absorbing performance of the third embodiment of the automotive interior component according to the present invention;

FIG. 25 shows impact absorbing performance of a variant of the third embodiment of the impact absorber used in the automotive interior component according to the present invention;

FIG. 25(a) illustrates a state before a side collision;

FIG. 25(b) illustrates a state after a side collision;

FIG. 26 is a perspective view of a configuration of another variant of the third embodiment of the impact absorber used in the automotive interior component according to the present invention;

FIG. 27 shows impact absorbing performance of the impact absorber in FIG. 26;

FIG. 27(a) illustrates a state before a side collision;

FIG. 27(b) illustrates a state after a side collision;

FIG. 30 is a sectional view taken along the line C-C in FIG. 29;

FIG. 31 is a sectional view taken along the line D-D in FIG. 29;

FIG. 32(a) illustrates a state before a side collision;

FIG. 32(b) illustrates a state after a side collision;

FIG. 34 is a perspective view of a fifth embodiment of an impact absorber used in the automotive interior component according to the present invention;

FIG. 35 is a sectional view taken along the line E-E in FIG. 34;

FIG. 46 is a graph showing the result of a side collision performance test of the impact absorber in FIG. 45;

FIG. 49 is a perspective view of a variant of the eighth embodiment of the impact absorber used in the automotive interior component according to the present invention;

FIG. 50 is a sectional view of a configuration of the impact absorber in FIG. 49;

FIG. 51 is a front view of a conventional automotive door trim;

FIG. 52 is a sectional view taken along the line F-F in FIG. 51;

FIG. 53 is a perspective view of a conventional impact absorber; and

FIG. 54 is a graph showing a correlation between a reaction force and an amount of intrusion of the conventional impact absorber.

DETAILED DESCRIPTION OF THE PREFERRED EMBODIMENTS

Now, embodiments in which an automotive interior component according to the present invention is applied to an automotive door trim will be described with reference to the accompanying drawings. It should be added that the gist of the present invention is as described in Claims, and the embodiments described below merely show examples of the present invention.

Embodiment 1

Figure 2:
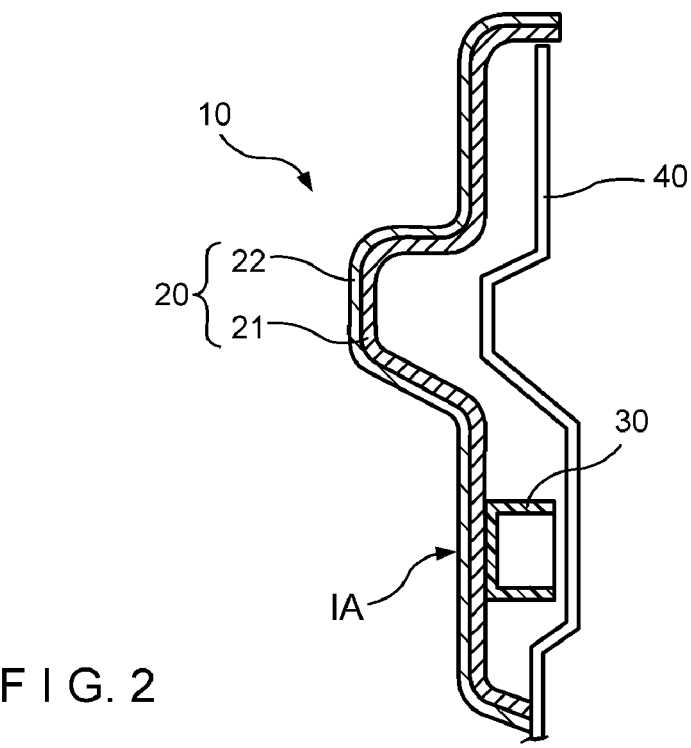
FIG. 2 is a sectional view taken along the line A-A in FIG. 1.
Figure 3:
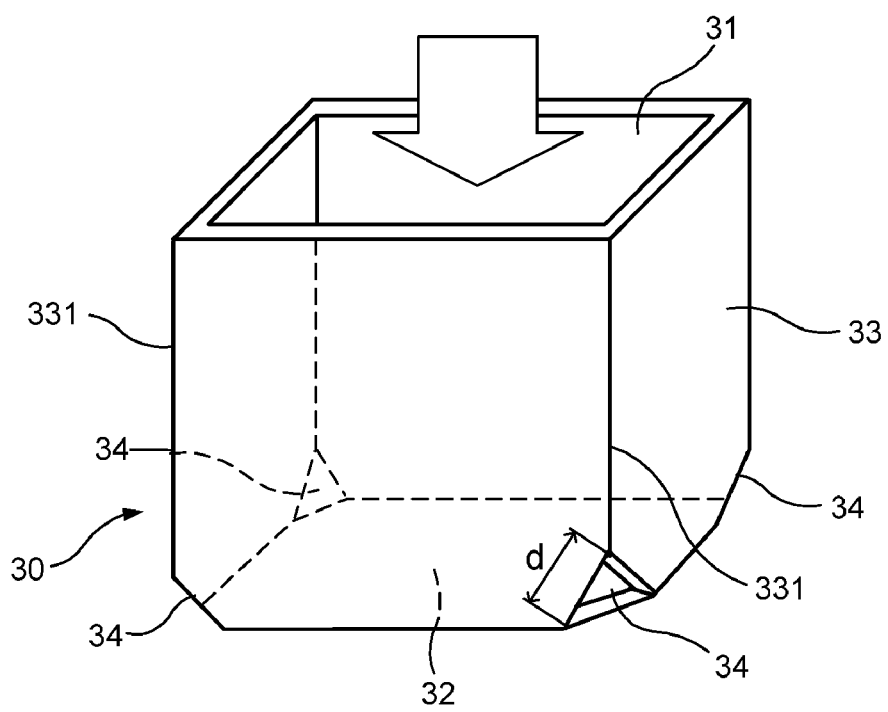
FIG. 3 is a perspective view of a first embodiment of an impact absorber used in the present invention.

FIGS. 1 to 5 show a first embodiment of the present invention, FIG. 1 is a front view of an automotive door trim to which the present invention is applied, FIG. 2 is a sectional view of a configuration of the automotive door trim, FIG. 3 illustrates an impact absorber provided in the automotive door trim, FIG. 4 illustrates a test method for measuring impact absorbing performance of the impact absorber, and FIG. 5 is a graph showing a correlation between a reaction force and an amount of intrusion of the impact absorber. FIGS. 6 and 7 show a variant of the first embodiment of the present invention, FIG. 6 is a perspective view of a configuration of an impact absorber used in the present invention, and FIG. 7 is a graph showing impact absorbing performance of the impact absorber. FIGS. 8 and 9 illustrate a configuration of another variant of an impact absorber of the first embodiment of the present invention.

First, with reference to FIGS. 1 to 5, the first embodiment of the present invention will be described. In FIGS. 1 and 2, an automotive door trim 10 is formed into a required shape, and includes a door trim body 20 as a base, and an impact absorber 30 placed in an impact area IA of the door trim body 20, that is, an area that the waist or shoulder of an occupant is prone to touch, in this embodiment, an area that the waist of an occupant is prone to touch.

More specifically, on the door trim body 20 of the door trim 10, an inside handle escutcheon 11 for releasing a door lock (not shown) is mounted, and an arm rest 12 is formed to expand on an interior side so that an occupant can place his/her elbow thereon for rest. On the arm rest 12A, a pull handle 13 and a power window switch finisher 14 are provided. A door pocket opening 15 is provided below the arm rest 12, and a speaker grill 16 is provided on a front side of the door pocket opening 15 integrally with or separately from the door trim body 20.

In the embodiment, the door trim body 20 is formed of a resin core member 21 formed into a required shape and having mounting rigidity to a door panel 40, and a surface skin 22 that is attached to a front surface of the resin core member 21 and improves touch and appearance. The resin core member 21 may be selected from polyethylene resin, polypropylene resin, polystyrene resin, polyethylene terephthalate resin, polyvinyl alcohol resin, vinyl chloride resin, polyamide resin, polyacetal resin, polycarbonate resin, ionomer resin, or acrylonitrile butadiene styrene (ABS) resin. In the embodiment, polypropylene resin into which filler such as talc is mixed is used, and polyolefin elastomer resin such as thermoplastic olefin is used as the surface skin 22. In the embodiment, the surface skin 22 is set in an unshown molding die, mold clamping of the molding die is performed, molten resin is injected and filled into a cavity of the resin core member 21, and thus the resin core member 21 is molded into a desired curved shape and the surface skin 22 is integrally molded to form the door trim body 20.

The automotive door trim 10 according to the present invention has a feature that a configuration of an impact absorber 30 that absorbs an impact load in a side collision is improved to provide good impact absorbing performance in a side collision.

The impact absorber 30 is formed as a hollow box body made of a resin material having high impact absorbing performance and having an opening on one side, and particularly intended to avoid stress concentration in the latter half period during an impact load. Specifically, the impact absorber 30 is made of an elastomer resin material including PP resin into which ethylene propylene rubber (EPR) is mixed. The impact absorber 30 includes an opening 31 facing the door panel 40, a bottom surface wall 32 placed on the side opposite to the opening 31 and secured to the resin core member 21, and a four-face side wall 33. The impact absorber 30 is in the shape of a cube having one side of 100 mm, and as shown in FIG. 3, corner cut portions 34 each of which has one side (denoted by d in FIG. 3) of 20 mm are provided in an open manner at four corner portions of the bottom surface wall 32. The corner cut portion 34 opens through an outer surface and an inner surface. When the impact absorber 30 is mounted to the door trim body 20, the opening 31 may be secured to the door trim body 20 with the bottom surface wall 32 facing the door panel 40.

Then, impact absorbing performance of the impact absorber 30 formed of the hollow box body will be described. First, as shown in FIG. 4, the bottom surface wall 32 of the impact absorber 30 is secured to a back surface of the resin core member 21 with a hot melt adhesive or the like, a load element 100 is hit from the side of the opening 31 toward the center of the opening 31 at a speed of 35 km/h and a torso angle of 0°, and a correlation between a reaction force value and an amount of bending of the impact absorber 30, that is, an amount of intrusion at that time is shown in the graph in FIG. 5.

As is apparent from the graph in FIG. 5, the reaction force is proportional to the amount of intrusion in the former half period during an impact load. On the other hand, it can be easily understood that the reaction force is reduced in the latter half period during an impact load after reaching a reaction force peak value of 8 kN. It can be supposed that in the former half period when the impact load is applied, the side wall 33 of the impact absorber 30 undergoes bending deformation and thus the reaction force is proportional to the amount of intrusion (the amount of bending of the side wall 33), and after the reaction force reaches the peak value (8 kN), in the embodiment, stress does not concentrate on one point as is conventional but is distributed to three points of each of the corner cut portions 34 provided at four corner portions of the bottom surface wall 32 of the impact absorber 30, the side wall 33 easily tears at the three points as base points, and the side wall 33 is easily broken to reduce the reaction force in the latter half period during an impact load.

Thus, in the first embodiment of the present invention, the elastomer resin material having high impact absorbing performance is formed into the hollow box shape, and the corner cut portions 34 are provided in an open manner at the four corner portions of the bottom surface wall 32 secured to the back surface of the resin core member 21, thereby avoiding stress concentration as on conventional corner portions, reducing the reaction force in the latter half period when the impact load is applied, and ensuring good energy absorbing performance. The shape of the corner cut portion 34 may be changed to tune energy absorbing performance, and further, the impact absorber 30 may be in the shape of a cylinder such as a triangular cylinder or a hexagonal cylinder besides the hollow cube as described above.

Next, FIGS. 6 and 7 show the variant of the first embodiment of the present invention. The variant is the same as the first embodiment other than a change in the configuration of the impact absorber 30, and thus the configuration of the impact absorber 30 only will be described. In the variant, as shown in FIG. 6, the corner cut portions 34 are provided in an open manner at the four corner portions of the bottom surface wall 32 as in the first embodiment, and a rounded portion 341 is provided on an upper side of each corner cut portion 34.

The rounded portion 341 is provided on the upper side of the corner cut portion 34, that is, at a joining portion of the corner cut portion 34 with a ridge 331 of the side wall 33, thereby preventing a crack along the ridge 331 of the side wall 33 before a predetermined reaction force is reached when an impact is applied.

Specifically, as shown in FIG. 7, the reaction force peak value of 8 kN is reached at the amount of intrusion of 80 mm, and in the former half period during an impact load before the peak value, an amount of energy absorption is increased by an amount corresponding to the area diagonally shaded in the graph in FIG. 7. Thus, the rounded portion 341 is added to the corner cut portion 34, and thus an excessive reduction in reaction force in the former half period during an impact load can be cancelled, and the reaction force can be increased also in the former half period during an impact load besides that the reaction force can be reduced in the latter half period during an impact load, thereby further increasing energy absorbing performance. The radius of curvature of the rounded portion 341 may be freely set according to an impact load to be controlled, and for example, the radius of curvature is preferably 0.5 to 20.

Next, FIGS. 8 and 9 show a further variant of the present invention, and the variant in FIGS. 8(a) and 8(b) has a feature in that the thickness of the side wall 33 is gradually changed so that the thickness b of the side wall 33 on the side of the bottom surface wall 32 is larger than the thickness a of the side wall 33 on the side of the opening 31. FIG. 8(b) is a sectional view taken along the line B-B in FIG. 8(a). Thus, also in this variant, the impact absorber 30 has the corner cut portions 34 provided in an open manner at the four corner portions of the bottom surface wall 32 and reduces a reaction force in the latter half period during an impact load, and the thickness change of the side wall 33 prevents an excessive reduction in reaction force in the former half period during an impact load, thereby ensuring the same operation and effect as the above described variant. Also, as shown in FIG. 9, instead of gradually changing the thickness of the side wall 33, a step 332 may be provided, and the thickness a of the side wall 33 on the side of the opening 31 and the thickness b of the side wall 33 on the side of the bottom surface wall 32 is set to a<b, thereby preventing an excessive reduction in reaction force in the former half period when the impact load is applied.

Embodiment 2

Figure 10:
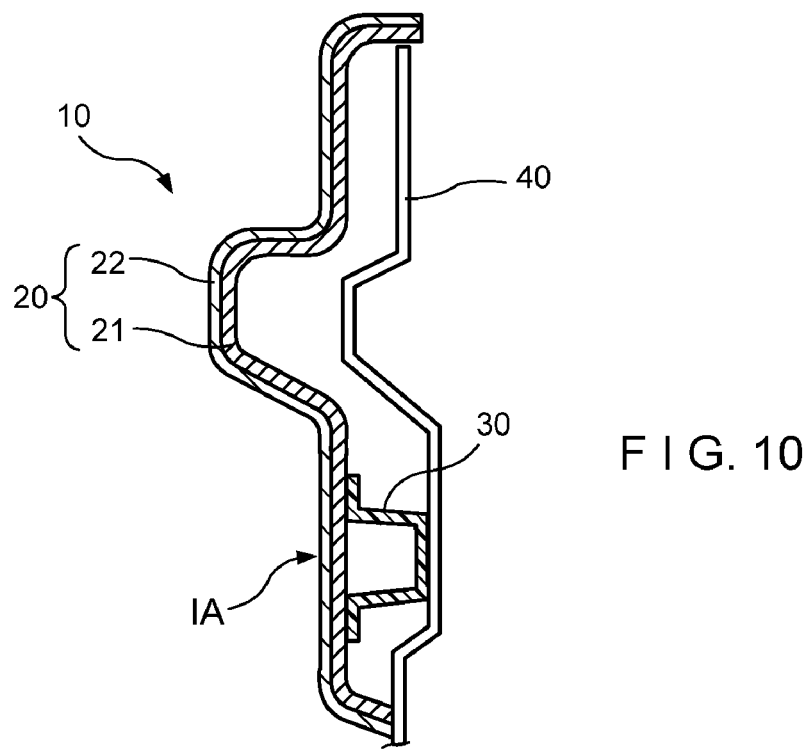
FIG. 10 is a sectional view of an automotive door trim to which a second embodiment of an automotive interior component according to the present invention is applied.
Figure 11:
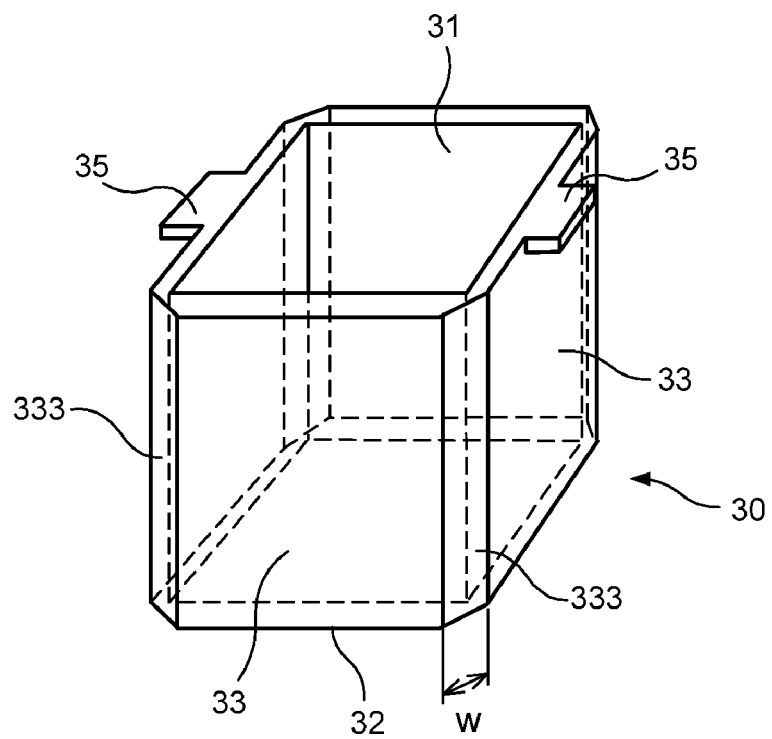
FIG. 11 is a perspective view of the second embodiment of the impact absorber applied to the automotive interior component according to the present invention.
Figure 18:
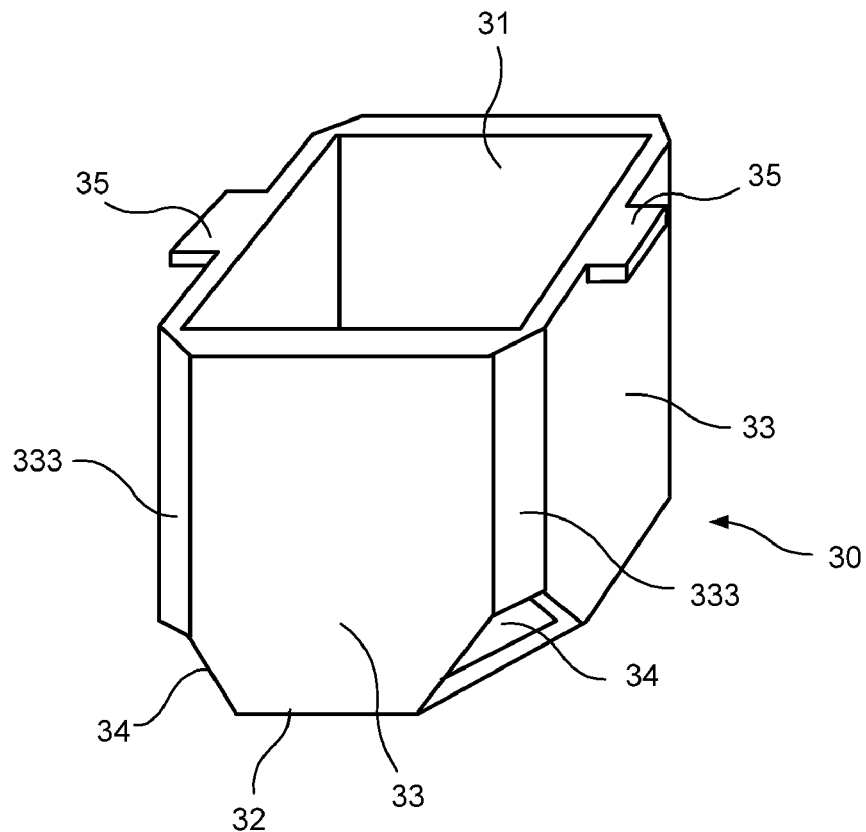
FIG. 18 is a perspective view of a further variant of the second embodiment of the impact absorber used in the automotive interior component according to the present invention.
Figure 19:
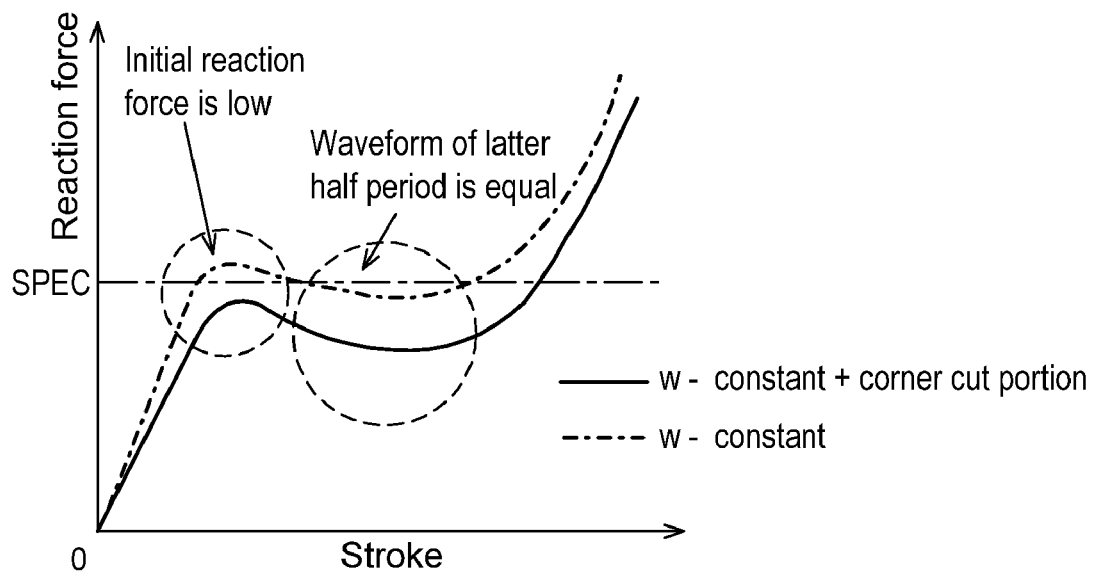
FIG. 19 is a graph showing impact absorbing performance of the impact absorber in FIG. 18.

FIGS. 10 to 19 shows a second embodiment of the present invention, FIG. 10 is a sectional view of a configuration of an automotive door trim, FIG. 11 is a perspective view of an impact absorber mounted to the automotive door trim, FIG. 12 illustrates impact absorbing performance of the automotive door trim, and FIG. 13 is a graph showing impact absorbing performance of the impact absorber. FIGS. 14 to 19 show a variant of the second embodiment of the present invention, FIG. 14 is a perspective view of an impact absorber, FIG. 15 is a graph showing impact absorbing performance of the impact absorber, FIG. 16 is a perspective view of another impact absorber, FIG. 17 is a graph showing impact absorbing performance of the impact absorber, FIG. 18 is a perspective view of a further impact absorber, and FIG. 19 is a graph showing impact absorbing performance of the impact absorber.

Also in the second embodiment, the automotive door trim 10 is formed into a required shape, and includes a door trim body 20 as a base, and an impact absorber 30 placed in an impact area IA of the door trim body 20, that is, an area that the waist or shoulder of an occupant is prone to touch.

In the second embodiment, the impact absorber 30 is made of an elastomer resin material including polypropylene (PP) resin into which ethylene propylene rubber (EPR) is mixed and formed as a hollow box body as a base by injection molding. As shown in FIGS. 10 to 12, the impact absorber 30 includes an opening 31 facing a door trim body 20, and mounting flanges 35 mounted to the door trim body 20 by ultrasonic welding, thermal welding, bonding or other mechanical fastening are provided in laterally symmetrical positions at edges of the opening 31. On the side opposite to the opening 31, a bottom surface wall 32 is provided to face a door panel 40, and a four-face side wall 33 is formed between the opening 31 and the bottom surface wall 32. The impact absorber 30 is substantially in the shape of a cube having one side of 100 mm. A structure may be adopted in which the opening 31 faces the door panel 40 and the bottom surface wall 32 is secured to the door trim body 20.

The second embodiment has a feature in an impact absorbing property of the impact absorber 30, particularly, effective control of a reaction force. Specifically, as a configuration therefor, in the embodiment, as is clearly shown in FIG. 11, a chamfered portion 333 is formed at a boundary portion (corner portion) of the four-face side wall 33 of the impact absorber 30, and the chamfered portion 333 extends from an opening side end 333 to a panel side end 333b, that is, from the opening 31 to the bottom surface wall 32. A chamfer width (denoted by reference character w in FIG. 11) of the chamfered portion 333 may be selected from a range of 2 to 4 mm. Thus, as shown in FIG. 12(a), when an impact F is applied laterally of the vehicle in a side collision or the like, an impact is applied from the door panel 40 to the bottom surface wall 32 of the impact absorber 30, and buckling deformation occurs so that the side wall 33 and the chamfered portion 333 expand outwardly as indicated by the arrows in FIG. 12(b). Thus, when the impact absorber 30 according to the second embodiment is used, as shown in FIG. 13, an initial reaction force is increased as compared with the case where a corner cut portion only is provided as in the conventional example. The corner portion tears and crashes in a side collision, thus the initial reaction force is increased, and four sides tear according the impact. Thus, a certain level of reaction force can be maintained, and the chamfer width w is adjusted to allow fine adjustment of the reaction force.

Next, FIGS. 14 to 19 show the variant of the second embodiment, and in the impact absorber 30 in FIG. 14, the chamfered portion 333 at the corner portion of the side wall 33 is formed so that the chamfer width is gradually reduced from the opening side end 333a to the panel side end 333b. For example, in the variant, a chamfer width w1 of the opening side end 333a is 4 mm, and a chamfer width w2 of the panel side end 333b is 2 mm. Thus, when the chamfer width is thus gradually reduced from w1 to w2, as in the graph in FIG. 15, the reaction force is increased as impact absorption proceeds. Thus, the variant is desirably adopted when a basic reaction force is less than a required value.

The opposite case of the above described variant is also supposed. Specifically, as shown in FIG. 16, the width of the chamfered portion 333 is changed so that the chamfer width w1 of the opening side end 333a is small and the chamfer width w2 of the panel side end 333b on the opposite side is large. In this case, as in the graph in FIG. 17, the reaction force is not increased as buckling deformation proceeds in a side collision, and such a configuration is effectively applied when the reaction force is excessively higher than a required value.

Further, as shown in FIG. 18, the corner cut portion 34 may be used together with the chamfered portion 333. Specifically, the panel side end 333b of the chamfered portion 333 can be notched to easily form the corner cut portion 34. The chamfered portion 333 is used together with the corner cut portion 34, thereby reducing an initial reaction force as in the graph in FIG. 19 and allowing fine control of the general reaction force and the initial reaction force. In addition to the combination of the chamfered portion 333 and the corner cut portion 34, the configuration of gradually changing the chamfer widths w1 and w2 of the chamfered portion 333 may be added.

Embodiment 3

Figure 22:
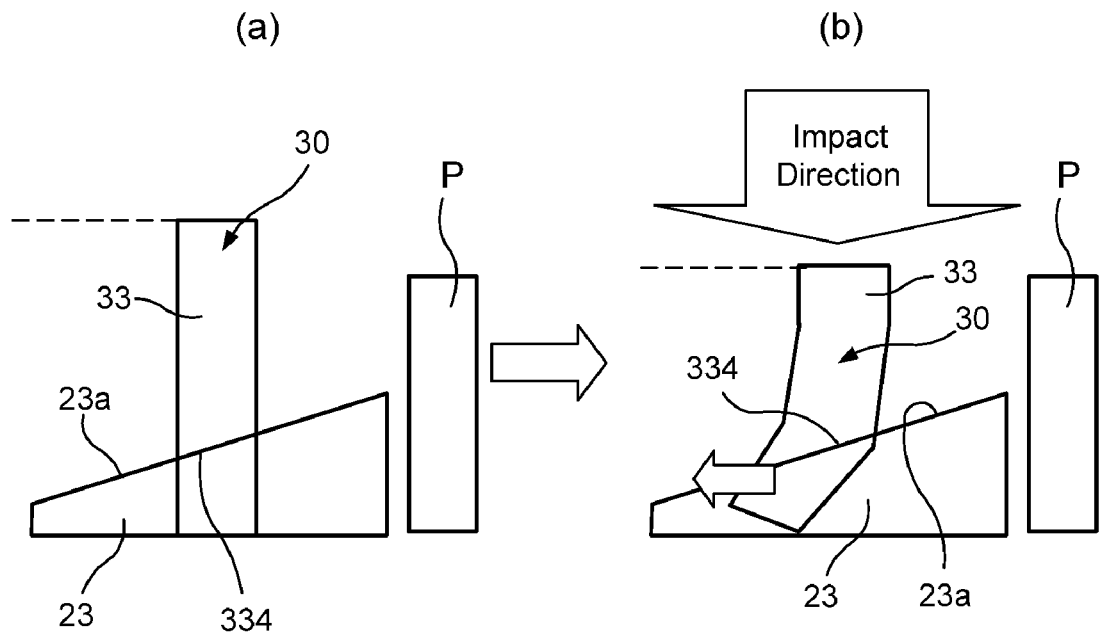
FIG. 22 shows impact absorbing performance of the third embodiment of the impact absorber used in the automotive interior component according to the present invention.
Figure 23:
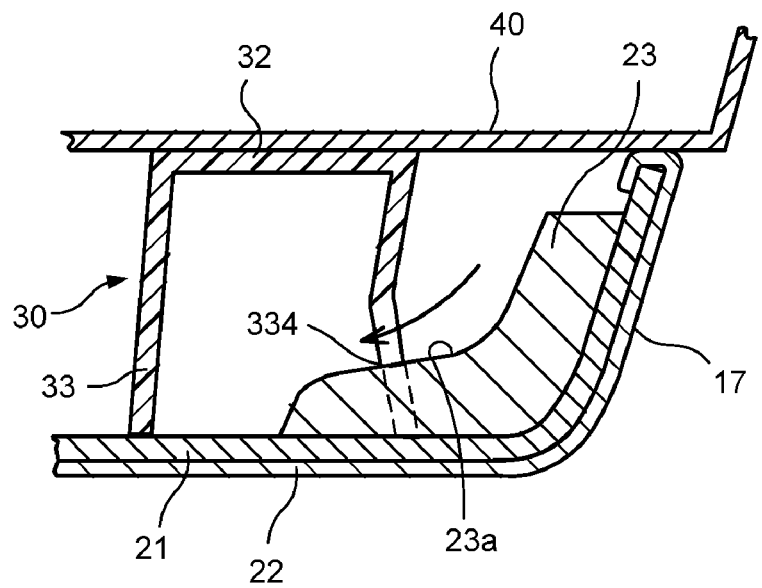
FIG. 23 is a sectional view showing impact absorbing performance of the impact absorber in FIG. 21 in a side collision.
Figure 28:
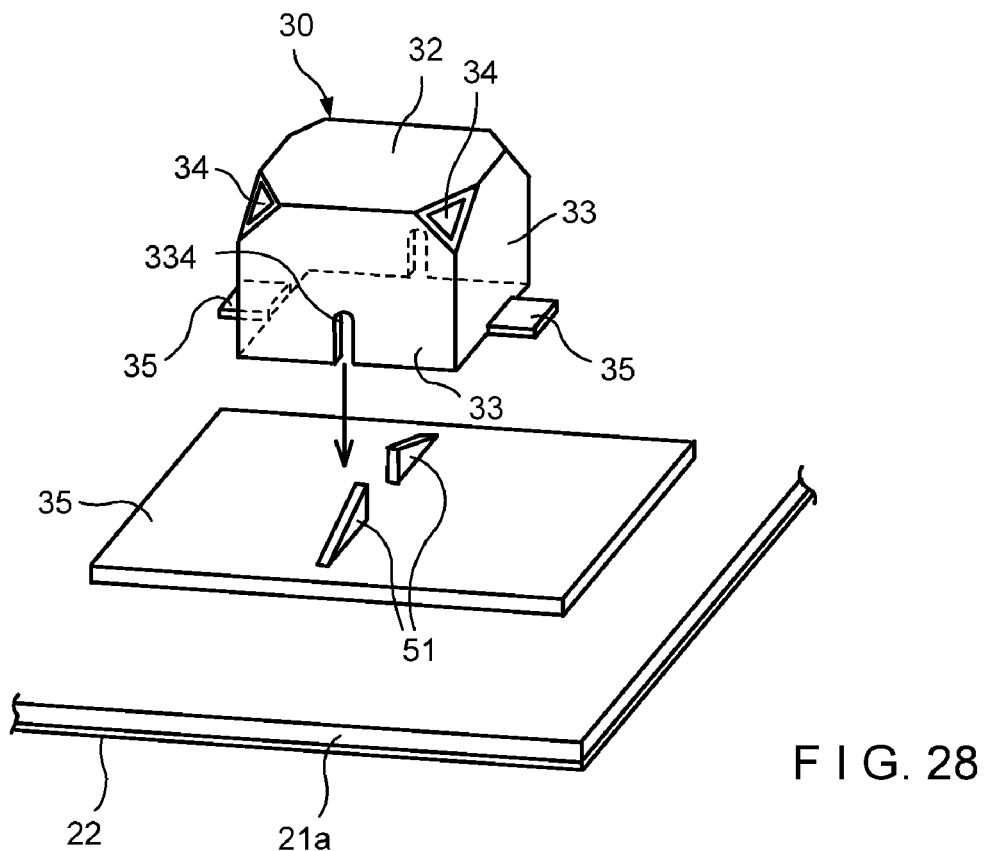
FIG. 28 illustrates a further variant of the third embodiment of the impact absorber used in the automotive interior component according to the present invention.

FIGS. 20 to 28 show a third embodiment of the present invention, FIG. 20 is a sectional view of a mounting structure of an impact absorber of a door trim, FIG. 21(a) is a perspective view of a configuration of the impact absorber, FIG. 21(b) is a sectional view thereof, FIG. 22 illustrates an operation of the impact absorber, FIG. 23 is a sectional view of a buckling state of the impact absorber in a side collision, FIG. 24 is a graph showing impact absorbing performance of the door trim, FIGS. 25 to 28 show a variant of the impact absorber used in the third embodiment of the present invention, FIG. 25 illustrates a variant in which a cam groove portion has an inclined surface, FIGS. 26 and 27 show a variant in which a locking notch is formed in a guide rib to allow more accurate reaction force control, FIG. 26 is a perspective view of the impact absorber, FIG. 27 illustrates a state during buckling deformation of the impact absorber, and FIG. 28 illustrates a variant in which the impact absorber according to the present invention is placed on an interior component made of a woody core material.

Also in the third embodiment, the automotive door trim 10 is formed into a required shape, and includes a door trim body 20 as a base, and an impact absorber 30 placed in an impact area IA of the door trim body 20, that is, an area that the waist or shoulder of an occupant is prone to touch.

In the third embodiment, the impact absorber 30 is made of an elastomer resin material including polypropylene (PP) resin into which ethylene propylene rubber (EPR) is mixed and formed as a hollow box body as a base by injection molding. As shown in FIGS. 20 and 21, the impact absorber 30 includes a bottom surface wall 32 that faces a door panel 40 and to which a load is applied in a side collision, and a side wall 33 connecting to four sides of the bottom surface wall 32. Mounting flanges 35 extending outwardly are integrated with lower opposite edges of the side wall 33 and are secured to a resin core member 21 of the door trim body 20 by ultrasonic welding, thermal welding, bonding or the like, and the door trim body 20 and the impact absorber 30 are integrated. The impact absorber 30 has a hollow box structure in the shape of a cube having one side of 100 mm, corner cut portions 34 are provided in an open manner at four corner portions of the bottom surface wall 32 facing the door panel 40, and the corner cut portions 34 reduce an initial reaction force in a side collision. A structure may be adopted in which an opening 31 faces the door panel 40, and the bottom surface wall 32 is secured to the door trim body 20. The corner cut portion 34 may be omitted if desired.

The third embodiment has a feature in an impact absorbing property of the impact absorber 30, particularly, effective control of a reaction force, and an increase in placement flexibility of the impact absorber 30. Specifically, in the third embodiment, as shown in FIG. 20, a vertical wall flange portion 17 is formed to face the door panel 40 along a peripheral edge of a product to provide three-dimensional feeling to the door trim body 20, and a guide rib 23 is integrally formed with the resin core member 21 from an inner surface of the vertical wall flange portion 17 toward a placement position of the impact absorber 30. The guide rib 23 has an inclined portion 23a inclined at a predetermined angle, and as shown in FIGS. 21(a) and 21(b), a cam groove portion 334 is provided over the guide rib 23 in a lower edge of the side wall 33 of the impact absorber 30.

The principle of both the guide rib 23 and the cam groove portion 334 will be described with reference to FIG. 22. FIG. 22(a) shows a state before a side collision and FIG. 22(b) shows a state after a side collision. Specifically, stress applied to the impact absorber 30 in a side collision is applied to the bottom surface wall 32 and then transferred to the side wall 33, and stress for buckling deformation is applied to the side wall 33. However, as in the third embodiment, the cam groove portion 334 is provided over the guide rib 23, and thus the side wall 33 slides in the arrow direction in FIG. 22(b) according to the inclination angle of the inclined portion 23a of the guide rib 23 to achieve cam action between the guide rib 23 and the cam groove portion 334, thereby avoiding the impact absorber 30 from interfering with a structure P. The structure P includes the vertical wall flange portion 17 for providing three-dimensional feeling to the door trim 10 as in the above described embodiment, and also an unshown door lock unit or the like provided in a pocket back cover or a door panel.

Thus, when an external impact is applied to the vehicle such as in a side collision, stress from the bottom surface wall 32 of the impact absorber 30 that hits the door panel 40 is transferred to the side wall 33, but as shown in FIG. 23, the cam groove portion 334 of the side wall 33 slides in the arrow direction along the inclined portion 23a of the guide rib 23, and thus the impact absorber 30 does not interfere with the vertical wall flange portion 17, the side wall 33 undergoes buckling deformation and does not interfere with the vertical wall flange portion 17 to rapidly increase a reaction force, thereby allowing effective control of the reaction force in a side collision.

Specifically, as shown in the graph in FIG. 24, in an initial period of a side collision, the cam groove portion 334 of the side wall 33 slides along the inclined portion 23a of the guide rib 23, thereby allowing the initial reaction force to be controlled to a low level as in the area (A) in the graph in FIG. 24, reducing insufficient crash as in the area (B) in the graph in FIG. 24. Thus, as compared with the graph of a conventional example indicated by the dotted line in FIG. 7, the initial reaction force can be adjusted to a low level and insufficient crash is reduced, thereby allowing effective control of the reaction force in a side collision.

Also, the buckling direction can be controlled so that the impact absorber 30 does not interfere with the vertical wall flange portion 17 or other structure P, thus the impact absorber 30 can be placed near the vertical wall flange portion 17 or other structure P, thereby increasing forming flexibility of the door trim 10 including the impact absorber 30.

Next, FIGS. 25 to 28 show the variant of the third embodiment of the present invention, and as shown in FIG. 25(a), an inclined surface 334a substantially in parallel with the inclined portion 23a of the guide rib 23 is formed in the cam groove portion 334 at the lower edge of the side wall 33 of the impact absorber 30. Thus, the inclined surface 334a that comes into slide contact with the guide rib 23 is formed in the cam groove portion 334 of the side wall 33, thereby allowing smoother slide shift of the side wall 33 as in FIG. 25(b) in a side collision, and further reducing an initial reaction force in a side collision.

Next, as shown in FIGS. 26 and 27, a configuration in which a locking notch 24 is formed in an arbitrary position in the inclined portion 23a of the guide rib 23 is adopted for reducing the reaction force and also for increasing the reaction force at an arbitrary point. Specifically, as is apparent from a state before a side collision in FIG. 27(a) and a state after a side collision in FIG. 27(b), if a load is applied to the bottom surface wall 32 of the impact absorber 30 in a side collision, the side wall 33 undergoes buckling deformation, and at that time, the cam groove portion 334 of the side wall 33 slides along the inclined portion 23a of the guide rib 23. At this time, the locking notch 24 provided in the guide rib 23 locks the side wall 33 in this position, thereby preventing further slide, inducing buckling deformation, and increasing the reaction force at this area. Thus, a control method of increasing a reaction force at an arbitrary point may be allowed.

Further, FIG. 28 shows the case where a woody core member 21a is used as the resin core member 21 of the door trim body 20. When a material hard to rib, for example, the woody core member 21a is used, a resin bracket 50 is separately used. The impact absorber 30 is mounted so that the cam groove portion 334 provided in the side wall 33 of the impact absorber 30 is placed over a guide rib 51 standing on the resin bracket 50, and thus the operation and effect as in the above described embodiment can be expected.

Embodiment 4

Figure 29:
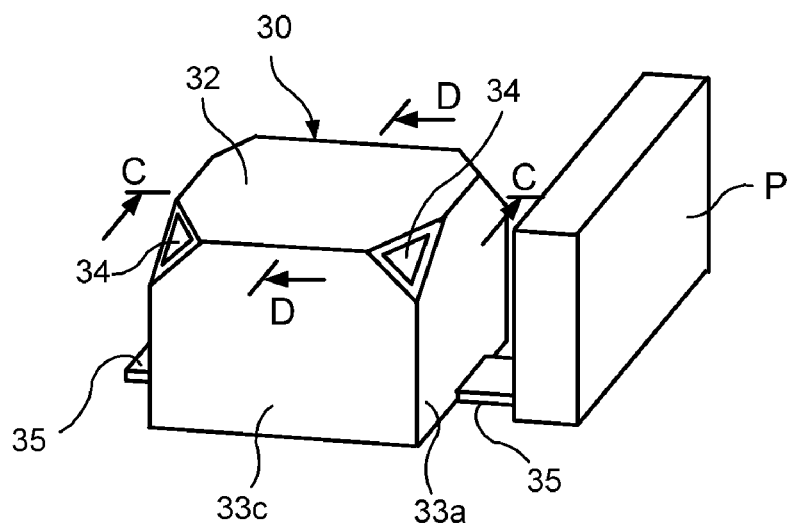
FIG. 29 is a perspective view of a fourth embodiment of an impact absorber used in the automotive interior component according to the present invention.
Figure 32:
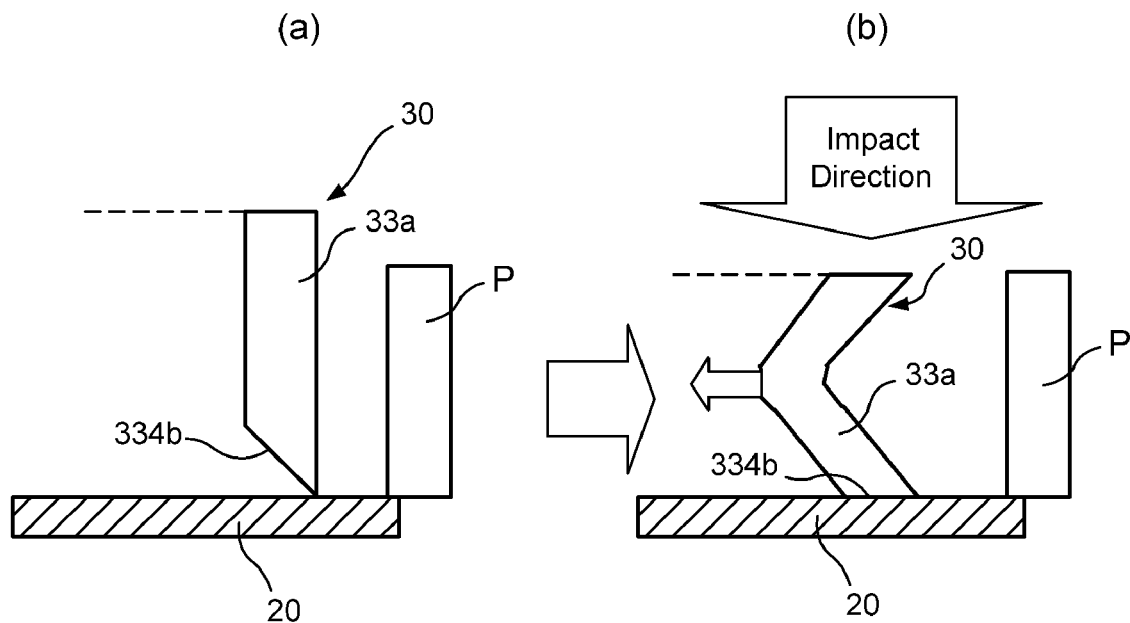
FIG. 32 shows impact absorbing performance of the fourth embodiment of the impact absorber in FIG. 29.
Figure 33:
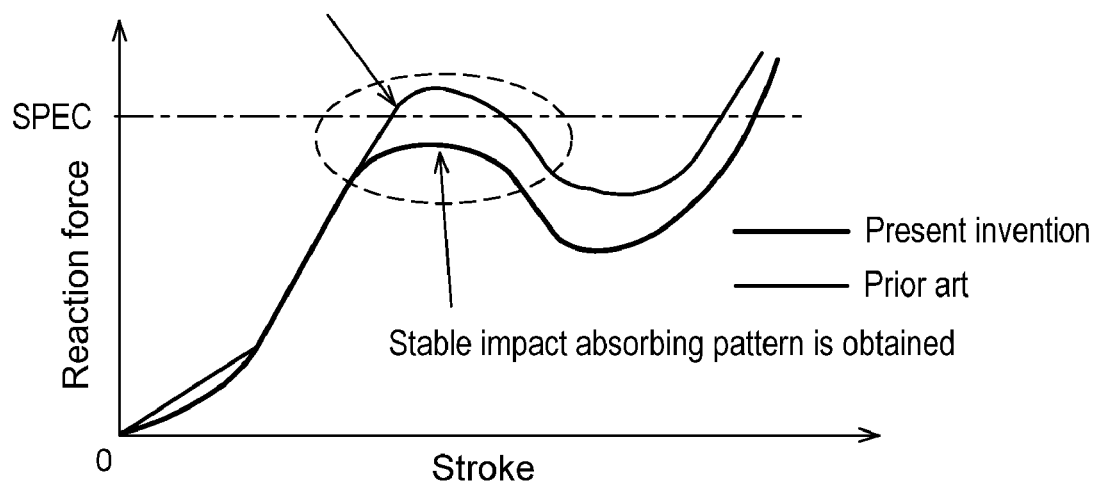
FIG. 33 is a graph showing impact absorbing performance of the impact absorber in FIG. 29.

FIGS. 29 to 33 show a fourth embodiment of the present invention, and the applied technical field is a door trim 10 including an impact absorber 30 placed on a back surface of an impact area IA of a door trim body 20 as in the first to third embodiments. FIG. 29 is a perspective view of the impact absorber placed on the door trim body seen from the back surface, FIGS. 30 and 31 are sectional views of a state where the impact absorber is mounted to the door trim body, FIG. 32 illustrates states before and after a side collision of the impact absorber, and FIG. 33 is a graph showing impact absorbing performance of the fourth embodiment.

In the fourth embodiment, the impact absorber 30 is formed as a hollow box body of resin, and mounted to the door trim body 20 via mounting flanges 35 as in the second and third embodiments. The impact absorber 30 of the fourth embodiment is also made of an elastomer resin material including polypropylene (PP) resin into which ethylene propylene rubber (EPR) is mixed and formed as a hollow box body by injection molding, and includes a bottom surface wall 32 and a side wall 33 connecting to four sides of the bottom surface wall 32, the mounting flanges 35 adjacent to the outside are integrated with opposite lower edges of the side wall 33, and corner cut portions 34 are provided in an open manner at four corner portions of the bottom surface wall 32 as in the second and third embodiments. Also in the fourth embodiment, a structure may be adopted in which an opening 31 faces the door panel 40, and the bottom surface wall 32 is secured to the door trim body 20. The corner cut portion 34 may be omitted if desired.

Further, in the fourth embodiment, the buckling direction can be controlled only by the shape of the impact absorber 30. Specifically, a lower end of the side wall 33 abuts against the back surface of the door trim body 20, but a lower end of a side wall 33a facing a structure P has a chamfer 334b facing inwardly, and a side wall 33b on the side opposite to the side wall 33a also has a chamfer 334b facing inwardly for avoiding interference with the structure P near the impact absorber 30 in a side collision. Side walls 33c and 33d adjacent to the side wall 33a facing the structure P each have a chamfer 334c facing outwardly.

Thus, in a side collision, as shown in FIG. 32(a), a press load is applied to the bottom surface wall 32 of the impact absorber 30, and at that time, the lower end of the side wall 33a facing the structure P has the chamfer 334b facing inwardly, and thus the side wall 33a is deformed in the arrow direction so that the chamfer 334b overlaps the door trim body 20. Thus, as shown in FIG. 32(b), the side wall 33a undergoes inward buckling deformation, and does not interfere with the structure P. For reference, for the side walls 33b, 33c and 33d other than the side wall 33a facing the structure P, as shown by dotted lines in FIGS. 30 and 31, the side wall 33 is deformed so that the chamfers 334b and 334c overlap the door trim body 20, and thus the buckling direction is controlled in arbitrary inward and outward directions and the side wall 33 undergoes buckling deformation.

Thus, in the fourth embodiment, as shown in the graph in FIG. 33, the impact absorber 30 does not interfere with the structure P, thereby preventing an excessive increase in initial reaction force, providing a stable impact absorbing pattern, and obtaining an ideal reaction force stroke curve.

Embodiment 5

Figure 36:
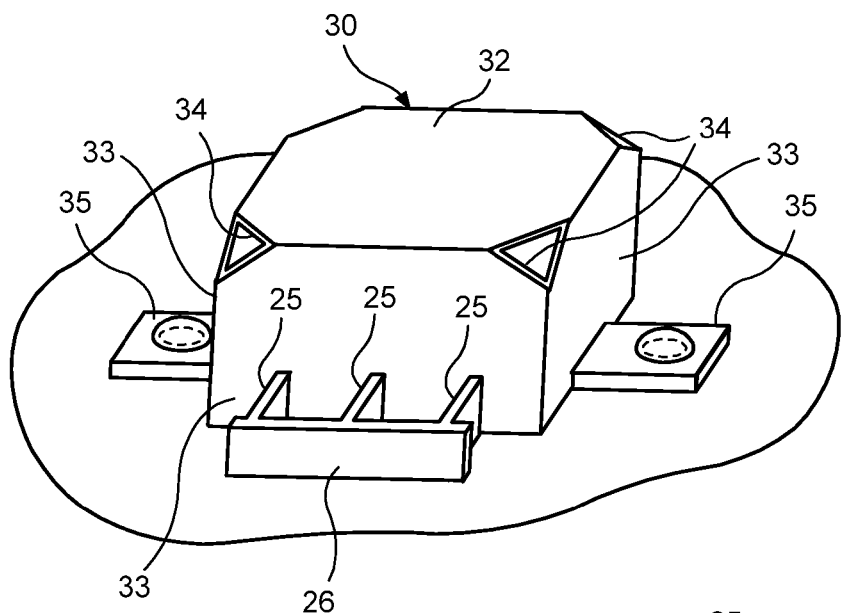
FIG. 36 is a perspective view of a variant of the fifth embodiment of the automotive interior component according to the present invention.
Figure 37:
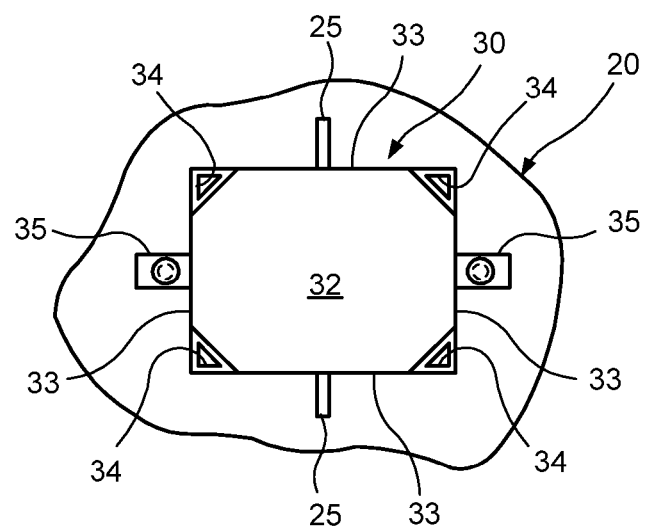
FIG. 37 is a plan view of another variant of the fifth embodiment of the impact absorber according to the present invention.
Figure 38:
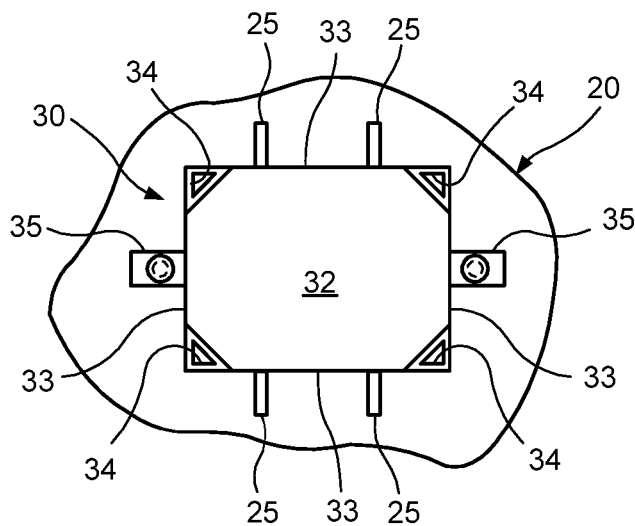
FIG. 38 is a plan view of a further variant of the fifth embodiment of the impact absorber used in the automotive interior component according to the present invention.

FIGS. 34 to 38 show a fifth embodiment of the present invention, FIG. 34 is a perspective view of an impact absorber mounted to a back surface of a door trim body, FIG. 35 is a sectional view of a mounting structure of the impact absorber, and FIGS. 36 to 38 are perspective and plan views of a variant of the fifth embodiment. Also in the fifth embodiment, the automotive door trim 10 is formed into a required shape, and includes a door trim body 20 as a base, and an impact absorber 30 placed in an impact area IA of the door trim body 20, that is, an area that the waist or shoulder of an occupant is prone to touch.

The impact absorber 30 is made of an elastomer resin material including polypropylene (PP) resin into which ethylene propylene rubber (EPR) is mixed and formed as a hollow box body as a base by injection molding.

As shown in FIGS. 34 and 35, the impact absorber 30 includes an opening 31 facing the door trim body 20, and a bottom surface wall 32 facing a door panel 40 on the side opposite to the opening 31, a four-face side wall 33 is formed between the opening 31 and the bottom surface wall 32, and corner cut portions 34 are provided in an open manner at four corner portions of the bottom surface wall 32 for reaction force adjustment in a side collision, and mounting flanges 35 secured to the door trim body 20 are formed on opposite sides of the opening 31. In the fifth embodiment, strut pieces 25 are integrally formed with a resin core member 21 of the door trim body 20 so as to abut against the side wall 33 of the impact absorber 30. Also in the fifth embodiment, a structure may be adopted in which the opening 31 faces the door panel 40, and the bottom surface wall 32 is secured to the door trim body 20. The corner cut portion 34 may be omitted if desired.

Thus, when the side wall 33 undergoes buckling deformation by a load applied to the impact absorber 30 in a side collision, the side wall 33 does not slide along the back surface of the door trim body 20, and a stopper function of the strut pieces 25 allows effective adjustment of a reaction force during an impact load.

In the fifth embodiment, three strut pieces 25 are formed on each lateral side of the side wall 33 of the impact absorber 30, but as shown in FIGS. 36 to 38, three strut pieces 25 may be integrated by a coupling piece 26 to increase strength of the strut pieces 25, or as shown in FIGS. 37 and 38, one or two strut pieces 25 may be provided.

Embodiment 6

Figure 39:
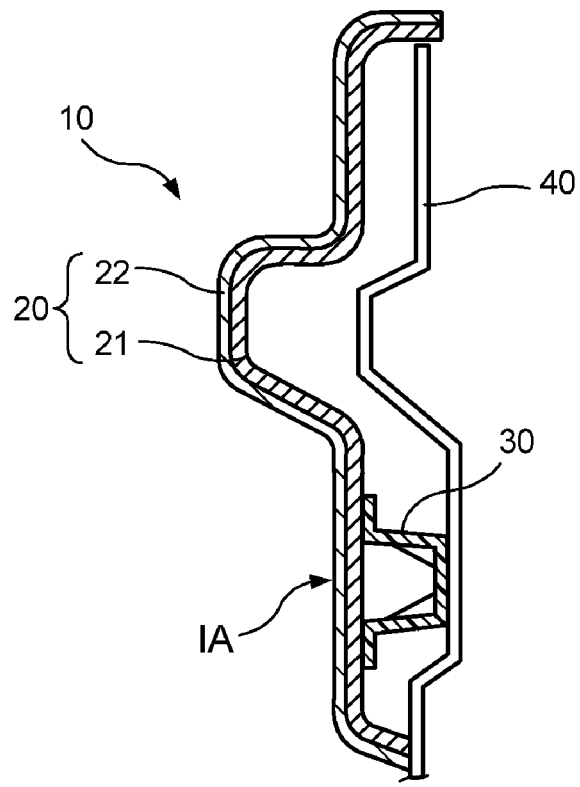
FIG. 39 is a sectional view of an automotive door trim to which a sixth embodiment of an impact absorber used in the automotive interior component according to the present invention is applied.
Figure 40:
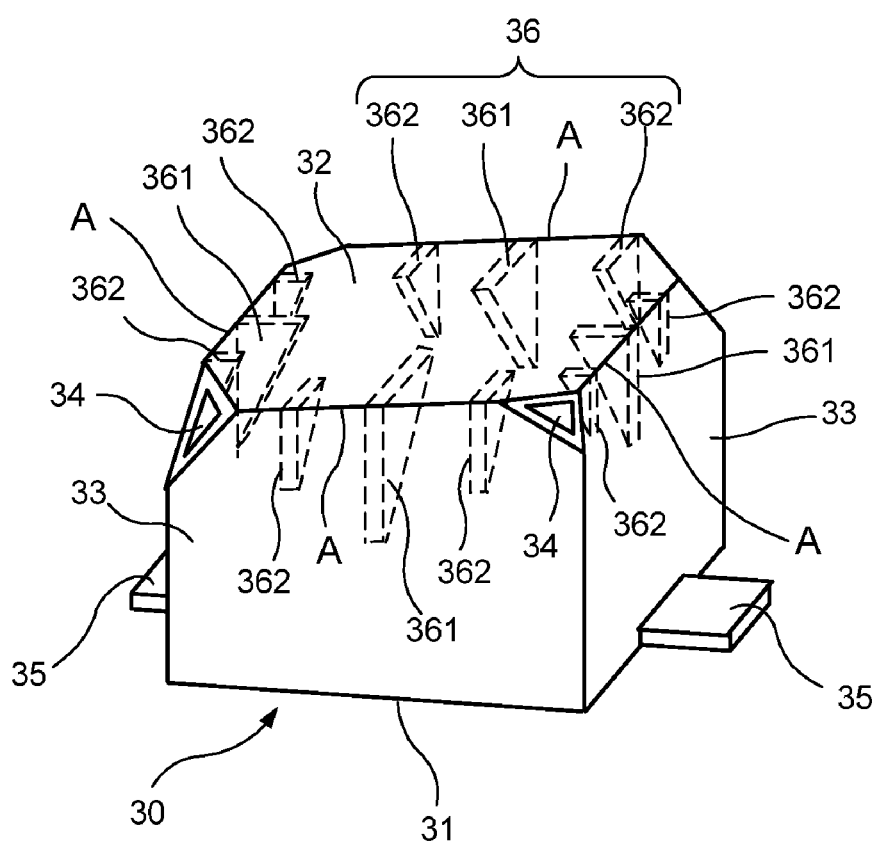
FIG. 40 is a perspective view of the sixth embodiment of the impact absorber used in the automotive interior component according to the present invention.
Figure 41:
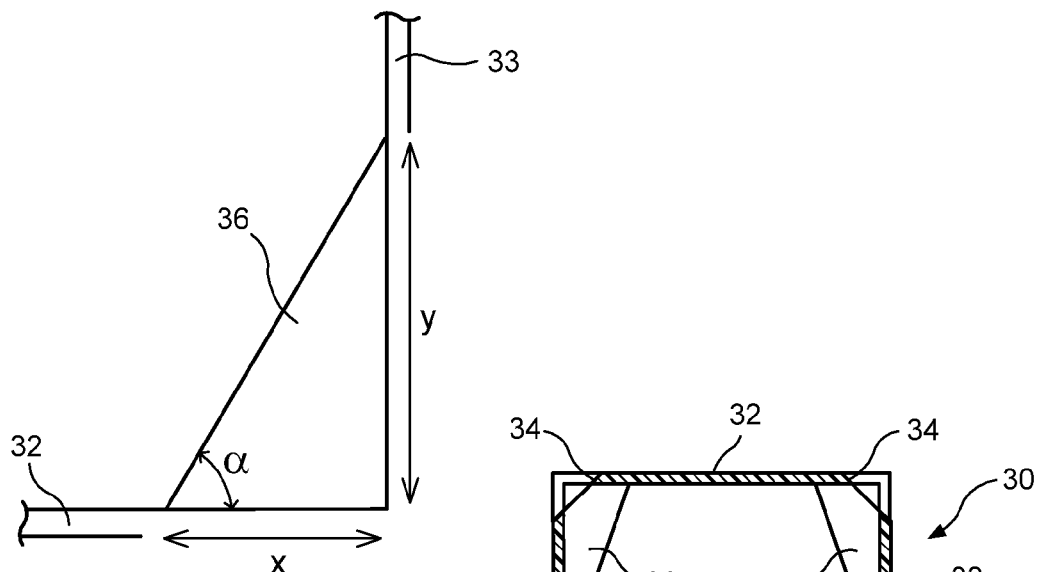
FIG. 41 illustrates the size and shape of a triangular rib in the impact absorber in FIG. 40.
Figure 42:
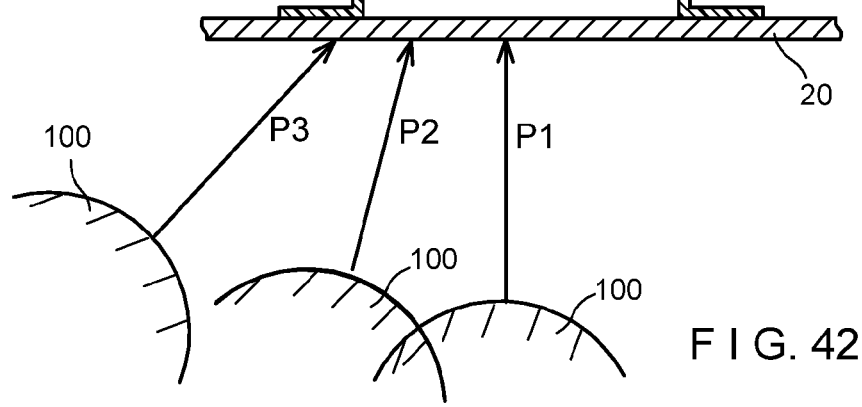
FIG. 42 illustrates how a side collision performance test is performed by applying impact loads from different directions to the impact absorber in FIG. 40.
Figure 43:
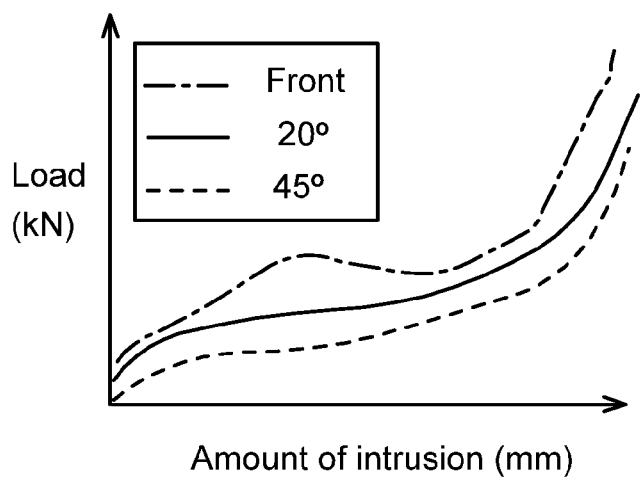
FIG. 43 is a graph showing the result of the side collision performance test of the impact absorber in FIG. 40.

FIGS. 39 to 43 show a sixth embodiment of the present invention, FIG. 39 is a sectional view of an automotive door trim, FIG. 40 is a perspective view of an impact absorber mounted to the automotive door trim, FIG. 41 illustrates a shape of a triangular rib in the impact absorber, FIG. 42 illustrates a state where impact loads from different directions are applied to the impact absorber, and FIG. 43 is a graph showing the result of a side collision performance test of the impact absorber in FIG. 42.

Also in the sixth embodiment, the automotive door trim 10 is formed into a required shape, and includes a door trim body 20 as a base, and an impact absorber 30 placed in an impact area IA of the door trim body 20, that is, an area that the waist or shoulder of an occupant is prone to touch.

In the embodiment, the impact absorber 30 is made of an elastomer resin material including polypropylene (PP) resin into which ethylene propylene rubber (EPR) is mixed and formed as a hollow box body as a base by injection molding. As shown in FIGS. 39 and 40, the impact absorber 30 includes an opening 31 facing the door trim body 20, and mounting flanges 35 mounted to the door trim body 20 by ultrasonic welding, thermal welding, bonding or other mechanical fastening are provided in laterally symmetrical positions at edges of the opening 31. On the side opposite to the opening 31, a bottom surface wall 32 is provided to face a door panel 40, and a four-face side wall 33 is formed between the opening 31 and the bottom surface wall 32. The impact absorber 30 is in the shape of a cube having one side of 100 mm as a reference outer shape. Also in the sixth embodiment, a structure may be adopted in which the opening 31 faces the door panel 40 and the bottom surface wall 32 is secured to the door trim body 20.

Further, in the impact absorber 30 of the sixth embodiment, corner cut portions 34 may be provided in an open manner at four corner portions of the bottom surface wall 32, if desired, for reducing an initial reaction force value when an impact load is applied in a side collision. The size of the corner cut portion 34 can be adjusted to control the initial reaction force value. Further, the embodiment has a feature to ensure sufficient impact absorbing performance even when impacts from different directions are applied to the impact absorber 30. Specifically, on an inner surface of the impact absorber 30, specifically from an inner surface of the bottom surface wall 32 to an inner surface of the side wall 33, triangular ribs 36 are formed perpendicularly to corner lines denoted by reference character A in FIG. 40. In the embodiment, three triangular ribs 36 are provided on each side, including a triangular rib 361 having a relatively large size in the middle and triangular ribs 362 having a smaller size on the lateral sides, but the number of triangular ribs 36 may be changed. For the size and shape of the triangular rib 36, as shown in FIG. 41, the height (y in FIG. 41) of the triangular rib 36 is preferably 50% to 80% of the height of the impact absorber 30, the size of the base (x in FIG. 41) of the triangular rib 36 is preferably 10% to 40% of the width of the impact absorber 30, and the angle α of the triangular rib 36 is preferably 20° to 45°, in view of an energy absorbing property. The large triangular rib 361 is provided in the middle and the smaller triangular ribs 362 are provided on the opposite sides thereof, thereby preventing an excessive increase in frontal reaction force, improving variations in reaction force against impacts from different directions, preventing an excessive increase in frontal reaction force, and thus providing a good energy absorbing property.

The result of a side collision performance test using an impactor 100 as an impact load applied to the impact absorber 30 in a front direction, a 20° inclined direction, and a 45° inclined direction in FIG. 42 is shown in the graph in FIG. 43. As is apparent from the graph in FIG. 43, reinforcement with the triangular ribs 36 increases, by 1.5 kN, the reaction force in the latter half period against the impact loads from different directions. As such, the reinforcement with the triangular ribs 36 improves variations in reaction force according to angles of impacts applied to the impact absorber 30, the case where the door trim 10 hits a person while being deformed in actual car tests can be accommodated, and sufficient energy absorption can be performed for impacts from different directions.

Embodiment 7

Figure 44:
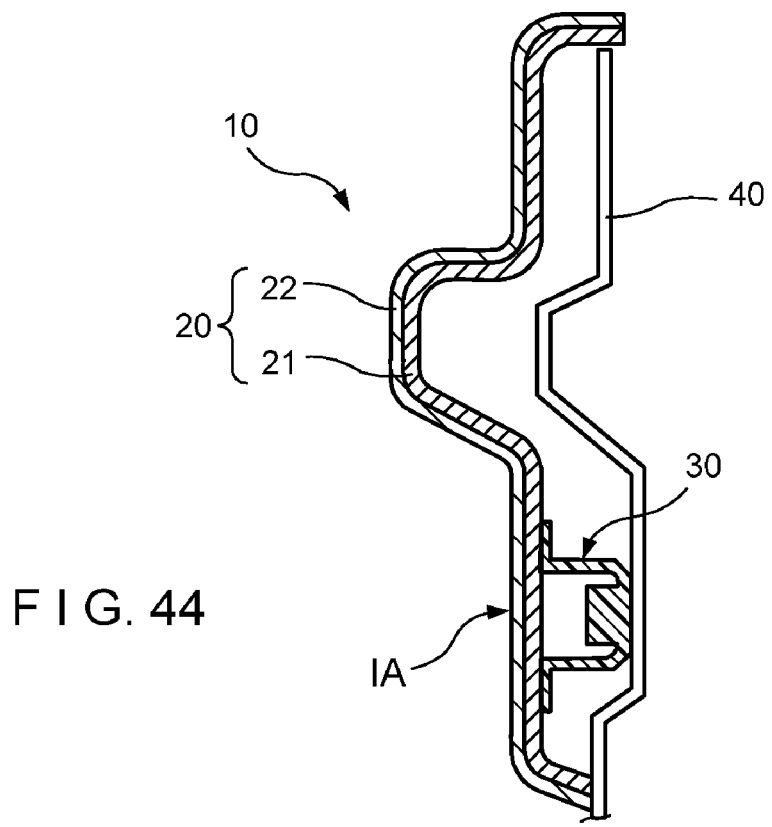
FIG. 44 is a sectional view of an automotive door trim to which a seventh embodiment of an impact absorber used in the automotive interior component according to the present invention is applied.
Figure 45:
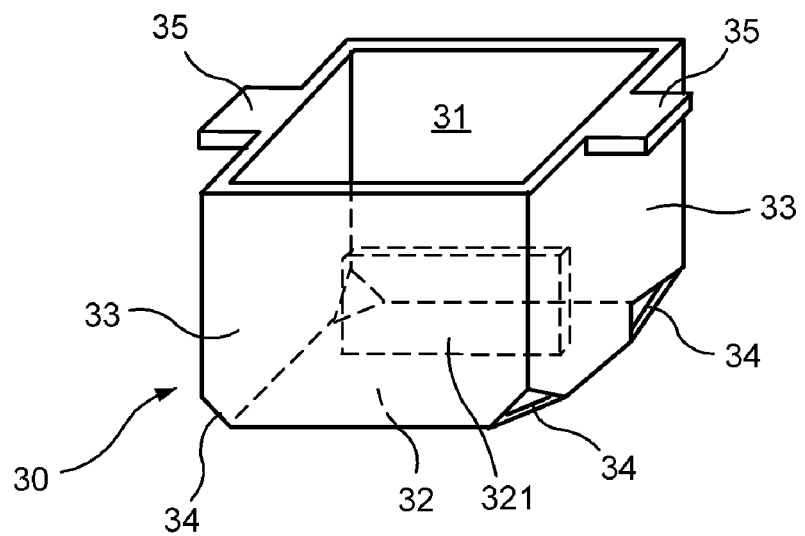
FIG. 45 is a perspective view of the seventh embodiment of the impact absorber used in the automotive interior component according to the present invention.

FIGS. 44 to 46 show a seventh embodiment of the present invention, FIG. 44 is a sectional view of an automotive door trim, FIG. 45 is a perspective view of an impact absorber mounted to the automotive door trim, and FIG. 46 is a graph showing a correlation between a reaction force and an amount of intrusion of the impact absorber in a side collision.

Also in the seventh embodiment, the automotive door trim 10 is formed into a required shape, and includes a door trim body 20 as a base, and an impact absorber 30 placed in an impact area IA of the door trim body 20, that is, an area that the waist or shoulder of an occupant is prone to touch.

In the seventh embodiment, the impact absorber 30 is made of an elastomer resin material including polypropylene (PP) resin into which ethylene propylene rubber (EPR) is mixed and formed as a hollow box body as a base by injection molding. As shown in FIGS. 44 and 45, the impact absorber 30 includes an opening 31 facing the door trim body 20, and mounting flanges 35 mounted to the door trim body 20 by ultrasonic welding, thermal welding, bonding or other mechanical fastening are provided in laterally symmetrical positions at edges of the opening 31. On the side opposite to the opening 31, a bottom surface wall 32 is provided to face a door panel 40, and a four-face side wall 33 is formed between the opening 31 and the bottom surface wall 32. The impact absorber 30 is in the shape of a cube having one side of 100 mm as a reference outer shape. Further, in the impact absorber 30, corner cut portions 34 are provided in an open manner at four corner portions of the bottom surface wall 32 for preventing an increase in initial reaction force value when an impact load is applied in a side collision, and the size of the corner cut portion 34 can be adjusted to control the initial reaction force value. Also in the seventh embodiment, a structure may be adopted in which the opening 31 faces the door panel 40 and the bottom surface wall 32 is secured to the door trim body 20. The corner cut portion 34 may be omitted if desired.

The seventh embodiment has a feature to prevent an excessive reduction in reaction force in the latter half period when the impact load is applied for increasing an impact absorbing property when an impact is applied to the impact absorber 30. Specifically, a plate-shaped inner surface rib 321 is provided on an inner surface of the bottom surface wall 32 of the impact absorber 30 in a protruding manner toward the opening 31. The inner surface rib 321 is formed with a space of about 1 to 5 mm from the side wall 33, and the rib height of the inner surface rib 321 is 10% to 90% of the height of the impact absorber 30. In the seventh embodiment, the rib height of the impact absorber 30 is 100 mm, and thus the rib height of the inner surface rib 321 is 10 to 90 mm. The inner surface rib 321 and the side wall 33 are not coupled because a reaction force in the latter half period is excessively increased if the both are coupled. The space is set to 1 to 5 mm because of die cutting.

Further, impact absorbing performance in using the impact absorber 30 in FIG. 45 is shown in the graph in FIG. 46, and the thickness, height and width of the inner surface rib 321 applied in the graph is 2.5 mm×40 mm×50 mm.

Thus, as is apparent from the graph in FIG. 46, in the impact absorber 30, the corner cut portions 34 are formed at the four corner portions, thereby reducing the initial reaction force value to a low value. Also, as compared with a conventional example (dotted line in the graph) without the inner surface rib 321, in the seventh embodiment (solid line in the graph), the reaction force in the latter half period when the impact load is applied is increased, thereby accommodating the case with a lower limit of a target value.

Embodiment 8

Figure 47:
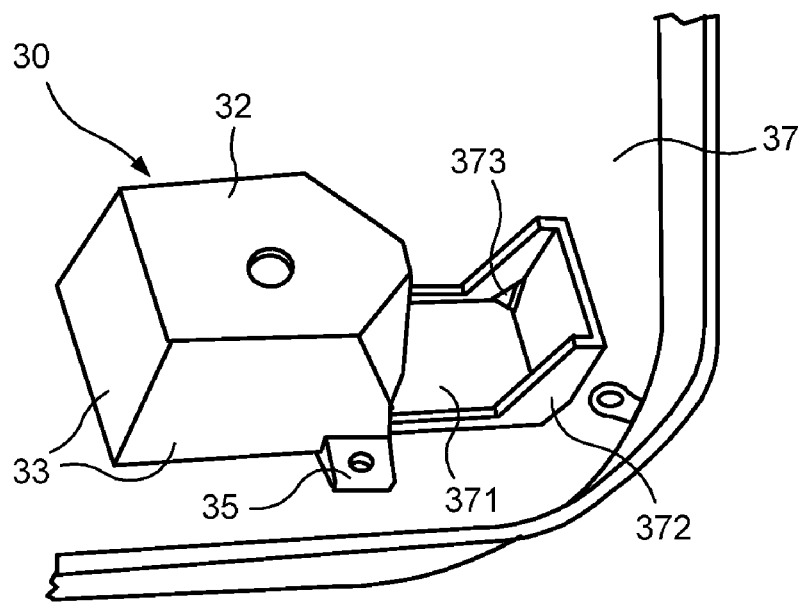
FIG. 47 is a perspective view of an eighth embodiment of an impact absorber used in the automotive interior component according to the present invention.
Figure 48:
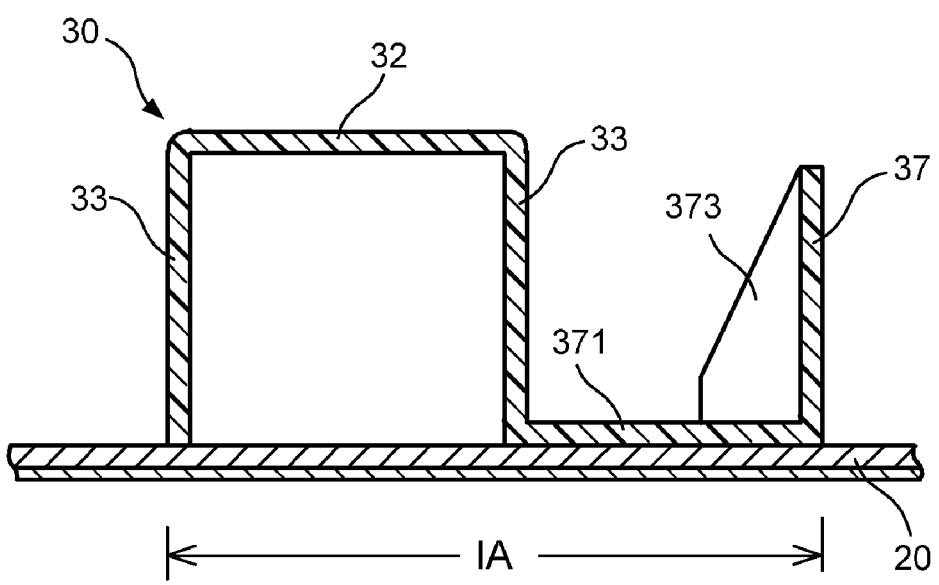
FIG. 48 is a sectional view of a configuration of the eighth embodiment used in the automotive interior component according to the present invention.

FIGS. 47 to 50 show an eighth embodiment of the present invention, FIG. 47 is a perspective view of an impact absorber and an impact absorbing rib mounted to a back surface of a door trim body, FIG. 48 is a sectional view of the impact absorber and the impact absorbing rib mounted to the back surface of the door trim body, and FIGS. 49 and 50 show a variant of the eighth embodiment of the present invention and are perspective and sectional views of the impact absorber and the impact absorbing rib mounted to the back surface of the door trim body.

Also in the eighth embodiment, the automotive door trim 10 is formed into a required shape, and includes a door trim body 20 as a base, and an impact absorber 30 placed in an impact area IA of the door trim body 20, that is, an area that the waist or shoulder of an occupant is prone to touch.

The eighth embodiment is intended to allow adjustment the impact area IA in a fore/aft direction of the vehicle so as to accommodate variations in front sheet position according to body types of an occupant, that is, variations between a woman and a general adult man. Specifically, the impact absorber 30 in the shape of a hollow box body including an opening 31 on one side is used, and a coupling plate 371 extending outwardly along the back surface of the door trim body 20 is integrally formed at an opening edge of the side wall 33 of the impact absorber 30. An impact absorbing rib 37 extending toward the door panel 40 is formed to stand at a front end of the coupling plate 371. Reinforcing ribs 372 are formed on opposite sides of the impact absorbing rib 37, and corner cut portions 373 are formed at corner portions.

As such, in the eighth embodiment, the impact absorbing rib 37 is added to the impact absorber 30, and as shown in FIG. 48, the impact area IA can be increased in the fore/aft direction of the vehicle to effectively absorb an impact load in a side collision for all from a small woman at a frontmost position and a general adult man.

Further, in the eighth embodiment, the impact absorbing rib 37 is integrated with the impact absorber 30 as the hollow box body via the coupling plate 371, and the impact area IA can be set in a broad range in the fore/aft direction of the vehicle with the impact absorber 30 as the hollow box body maintaining a compact size. Thus, if there is a protrusion from the door panel 40 toward the door trim 10, an irregular shape formed by the impact absorber 30, the coupling plate 371, and the impact absorbing rib 37 can effectively avoid interference with the door panel 40. When the impact absorber 30 is secured to the door trim body 20, a structure may be adopted in which the opening 31 faces the door panel 40, and the bottom surface wall 32 is secured to the door trim body 20. The corner cut portion 34 may be omitted if desired.

Further as shown in FIGS. 49 and 50, the position of the reinforcing rib 372 between the side wall 33 of the impact absorber 30 and the impact absorbing rib 37 may be changed, a front end flange 374 that effectively receive a load may be formed at the front end of the impact absorbing rib 37, and the shapes may be changed.

In the above described embodiments, the impact absorber 30 is mounted in the impact area IA of the door trim body 20 that the waist of the occupant is prone to touch, but may be mounted to an area that the shoulder of the occupant is prone to touch, and the mounting position of the impact absorber 30 is not limited. Further, the door trim body 20 may be made of a woody core material or other various materials besides the resin core material. In the embodiment, the impact absorber 30 is made of synthetic resin to which elastomer ingredient is added, but not limited to this, other resin materials may be used.

What is claimed is:

1. An automotive interior component (10) mounted to an interior side of a side wall panel (40) of a vehicle, comprising:
a trim body (20) as a base; and
an impact absorber (30) placed on a back surface of the trim body (20) in an impact area (IA) that the waist or shoulder of an occupant is prone to touch in a side collision, wherein said impact absorber (30) is formed of a hollow box body of resin having an opening (31) on one side and a bottom surface wall (32) on the other side, mounted to the trim body (20) with one of said opening (31) and said bottom surface wall (32) facing the side wall panel (40), said impact absorber (30) being provided with a corner cut portion (34) at the corner constituted of the bottom surface wall (32) and side walls (33) of the impact absorber (30) by cutting.

2. The automotive interior component according to claim 1, wherein said impact absorber (30) is further provided with a chamfered portion (333) at the corner of the side wall (33) of the impact absorber (30), and the chamfered portion (333) increases an initial reaction force in a side collision.

3. The automotive interior component according to claim 1, wherein said impact absorber (30) is further provided with a cam groove portion (334), said cam groove portion being formed in the side wall (33) of the impact absorber (30), wherein a guide rib (23) having an inclined portion (23a) is formed on the back surface of the trim body (20), and the guide rib (23) is housed in the cam groove portion (334), and when a load is applied to the impact absorber (30) in a side collision, the cam groove portion (334) slides along the inclined portion (23*a*) of the guide rib (23) to facilitate buckling deformation of the impact absorber (30) while controlling a buckling direction.

4. The automotive interior component according to claim 1, wherein an outer surface of the side wall (33) of said impact absorber (30) abuts a strut piece (25) provided on the back surface of the trim body (20).

5. The automotive interior component according to claim 1, wherein said impact absorber (30) is further provided with a triangular rib (36) formed on an inner surface of the impact absorber (30) from the bottom surface wall (32) to the side wall (33) for controlling excessive bending deformation of the side wall (33) caused by impacts from different directions.

6. The automotive interior component according to claim 1, wherein said impact absorber (30) is further provided with an inner surface rib (321) that is provided to stand on the inner surface of the bottom surface wall (32) of the impact absorber (30) and extends toward the opening (31) while maintaining a space from the side wall (33), and rigidity of the inner surface rib (321) prevents a reduction in reaction force in the latter half period in a side collision.

7. The automotive interior component according to claim 1, wherein said impact absorber (30) is further provided with an impact absorbing rib (37) that has a coupling plate (371) extending outwardly from the side wall (33) placed on a lateral side of the four-face side wall (33) of the impact absorber (30) along the back surface of the trim body (20) and is provided so as to stand toward the side wall panel (40) via the coupling plate (371), and besides the impact absorber (30), the impact absorbing rib (37) also undergoes buckling deformation in a side collision to increase an area as the impact area (IA) in a longitudinal direction of the vehicle.

* * * * *